United States Patent
Dunbar et al.

(10) Patent No.: US 12,264,577 B2
(45) Date of Patent: Apr. 1, 2025

(54) DOWNHOLE PRESSURE CALCULATION BASED ON STRAIN GAUGE MEASUREMENTS

(71) Applicant: Halliburton Energy Services, Inc., Houston, TX (US)

(72) Inventors: Bradley David Dunbar, The Woodlands, TX (US); Yi Pan, The Woodlands, TX (US); Paul Gerard Cairns, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 51 days.

(21) Appl. No.: 17/450,140

(22) Filed: Oct. 6, 2021

(65) Prior Publication Data

US 2023/0108851 A1     Apr. 6, 2023

(51) Int. Cl.
| | |
|---|---|
| *E21B 47/06* | (2012.01) |
| *E21B 47/007* | (2012.01) |
| *G01L 1/22* | (2006.01) |

(52) U.S. Cl.
CPC .......... *E21B 47/06* (2013.01); *E21B 47/007* (2020.05); *G01L 1/2206* (2013.01)

(58) Field of Classification Search
CPC ..... E21B 47/06; E21B 47/007; G01L 1/2206; G01L 1/22
See application file for complete search history.

(56) References Cited

U.S. PATENT DOCUMENTS

| | | | | |
|---|---|---|---|---|
| 2005/0194184 | A1* | 9/2005 | Gleitman | E21B 47/00 |
| | | | | 703/10 |
| 2005/0279532 | A1* | 12/2005 | Ballantyne | G01V 1/42 |
| | | | | 175/40 |
| 2007/0272442 | A1 | 11/2007 | Pastusek et al. | |
| 2009/0165548 | A1 | 7/2009 | Pop et al. | |
| 2011/0280104 | A1* | 11/2011 | McClung, III | E21B 3/02 |
| | | | | 175/170 |
| 2013/0008648 | A1* | 1/2013 | Lovorn | E21B 21/103 |
| | | | | 166/250.01 |
| 2018/0023382 | A1* | 1/2018 | Ringer | E21B 47/00 |
| | | | | 175/50 |

FOREIGN PATENT DOCUMENTS

| | | | | |
|---|---|---|---|---|
| WO | WO-2013138034 A2 | * | 9/2013 | E21B 12/00 |

* cited by examiner

*Primary Examiner* — Caroline N Butcher

(74) *Attorney, Agent, or Firm* — DeLizio, Peacock, Lewin & Guerra, LLP

(57) ABSTRACT

As a wellbore is extended into a formation, hydrostatic and hydrodynamic pressures change due to variations in drilling mud weight, fluid density, etc. Strain gauges downhole measure forces experienced by drilling equipment. During drilling, a strain gauge measures strain applied between the drill string and the formation. When off bottom, the strain gauge measures forces experienced by the drill string other than drilling forces. A pressure calculator converts off bottom strain gauge measurements into measurements of hydrostatic pressure for periods without fluid flow (i.e., when drilling motors are paused) and into measurements of hydrodynamic pressure for periods with fluid flow (i.e., when mud motors are operating). The pressure calculator correlates strain measurements (usually in voltages) to pressure based on a predetermined relationship for a given wellbore geometry (e.g., hole diameter, drill bit diameter, drill pipe diameter, etc.).

20 Claims, 16 Drawing Sheets

DOWNHOLE PRESSURE CALCULATION BASED ON STRAIN GAUGE MEASUREMENTS

TECHNICAL FIELD

The disclosure generally relates to earth drilling including mining and earth drilling, e.g., deep drilling, for obtaining oil, gas, water, soluble or meltable materials or a slurry of minerals from wells, and to hydrostatic and hydrodynamic pressure determination.

BACKGROUND

Drill strings and drill bits in a wellbore experience hydrostatic pressure, which is a result of drilling mud weight under gravitational forces, and hydrodynamic pressure when drilling mud or other fluids are flowing or circulating. Pressure is a measure of force per unit area, where such forces can cause deformation of the drill string and drill bit, and pressure can therefore be determined from measurements of strain experienced by the drill string and drill bit. Pressure measurements generate information about drilling conditions downhole which can be used to control drilling processes. Pressure is traditionally measured downhole with one or more pressure transducer.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to strain gauges associated with drill bits in illustrative examples. Aspects of this disclosure can be also applied to strain gauges associated with components of a drill string, wellbore, casing, etc. In other instances, well-known instruction instances, protocols, structures and techniques have not been shown in detail in order not to obfuscate the description.

Overview

As a wellbore is extended into a formation, hydrostatic and hydrodynamic pressures change due to variations in drilling mud weight, fluid velocity, etc. Strain gauges downhole measure forces experienced by various types of drilling equipment (e.g., drill pipes, drill bits, etc.). During drilling, a strain gauge is used to measure strain applied between the drill string and the formation. When off bottom, the strain gauge measures forces experienced by the drill string other than drilling forces. A pressure calculator converts off bottom strain gauge measurements into measurements of hydrostatic pressure for periods without fluid flow (i.e., when drilling motors are paused) and into measurements of hydrodynamic pressure for periods with fluid flow (i.e., when mud motors are operating). The pressure calculator correlates strain measurements (usually in millivolts (mV) per volts (V) or mV/V) to pressure based on a predetermined relationship for a given wellbore geometry (e.g., hole diameter, drill bit diameter, drill pipe diameter, etc.) and downhole temperature. Direct determination of hydrostatic and hydrodynamic pressure from a strain gauge simplifies sensor utilization downhole without sacrificing information.

Example Illustrations

Figure 1:
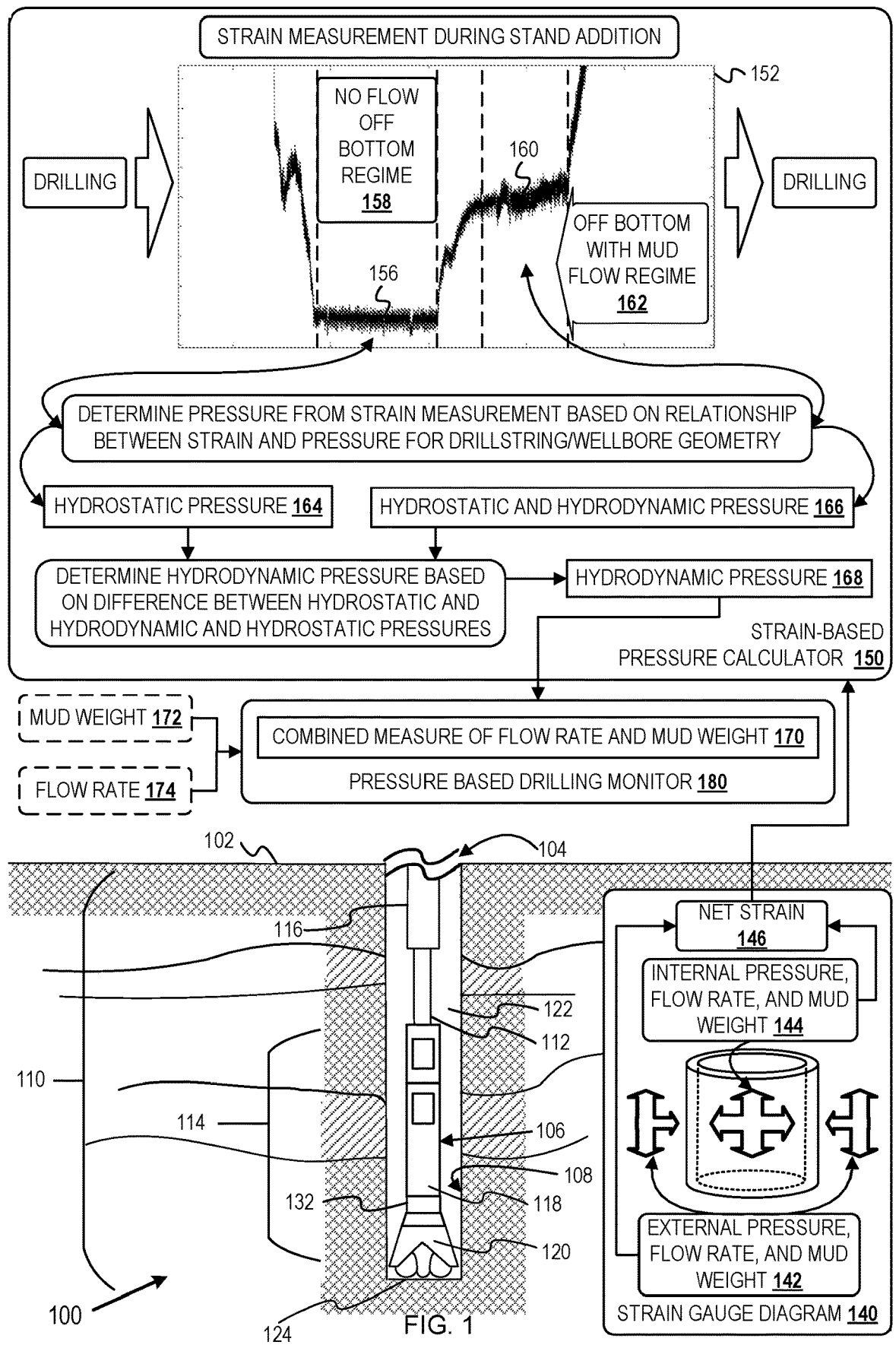
FIG. 1 depicts an example system for determining pressure at a location on a drillstring based on strain measurements.

FIG. 1 depicts an example system for determining pressure at a location on a drillstring based on strain measurements. FIG. 1 includes a schematic diagram of an example drilling apparatus 100, a schematic diagram of a strain gauge 140, a schematic diagram of a strain-based pressure calculator 150 (hereinafter "the pressure calculator 150"), and schematic diagram of a pressure-based drilling monitor 180.

Drilling of oil and gas wells is commonly carried out using a string of drill pipes connected together to form a drillstring 106 that can be lowered through a rotary table into a wellbore 108. The drillstring 106 may operate to penetrate the rotary table for drilling the wellbore 108 through subsurface formations 110. The drillstring 106 may include a kelly, drill pipe 112, and a bottom hole assembly (BHA) 114, perhaps located at the lower portion of the drill pipe 112. The example drilling apparatus 100 may also include a drilling rig located at the surface 102 of a well 104, where the drilling rig is not shown here for simplicity.

The BHA 114 may include drill collars 116, a down hole tool 118, and a drill bit 120. The drill bit 120 may operate to create a wellbore 108 by penetrating the surface 102 and subsurface formations 110. The down hole tool 118 may comprise any of a number of different types of tools including a mud pump, MWD tools, LWD tools, and others. The drillstring 106 also includes a strain gauge 132 and can include additional strain gauges. The strain gauge 132 is depicted as proximate to the drill bit 120 and located in the BHA 114, but it should be understood that the strain gauge 132 can be disposed at any location on the drillstring 106—such as outside the BHA 114, at the drill collar 116, internal to or external to the drillstring 106 between the drill collar 116 and the BHA 114, within or associated with one or more down hole tool 118, integrated into the drill bit 120, including within a connection or shank of the drill bit 120. Only the strain gauge 132 is depicted, but multiple strain gauges of the same or different types can be disposed along the drillstring 106 and in different portions of the example drilling apparatus 100. The strain gauge 132 can include a processor and memory or be in communication with a device with a processor and memory.

During drilling operations, a mud pump may pump drilling fluid (sometimes known by those of ordinary skill in the art as "drilling mud") from a mud pit through a hose into the drill pipe and down to the drill bit 120. The drilling fluid can flow out from the drill bit 120 and be returned to the surface 102 through an annular area 122 between the drill pipe 112 and the sides of the wellbore 108. The drilling fluid may then be returned to the mud pit, where such fluid is filtered. In some embodiments, the drilling fluid can be used to cool the drill bit 120, as well as to provide lubrication for the drill bit 120 during drilling operations. Additionally, the drilling fluid may be used to remove subsurface formation 110 cuttings created by operating the drill bit 120. In some embodiments the drill bit 120, other elements of the BHA 114 (such as the down hole tool 118) or the strain gauge 132 can send communications to a surface-based controller or operator via electronic, acoustic (e.g., mud motor or mud pulse telemetry), optical, etc. means of communication.

During drilling operations, the drillstring 106 (perhaps including the kelly, the drill pipe 112, and the BHA 114) may be rotated by the rotary table. In addition to, or alternatively, the BHA 114 or a portion of the BHA 114 may also be rotated by a motor (e.g., a mud motor) that is located down hole. The drill collars 116 may be used to add weight to the drill bit 120. The drill collars 116 may also operate to stiffen the BHA 114, allowing the BHA 114 to transfer the added weight to the drill bit 120, and in turn, to assist the drill bit 120 in penetrating the surface 102 and subsurface formations 110.

The drill bit 120 can contact a bottom 124 (of a vertical wellbore) or lateral end (of a lateral wellbore) of the wellbore 108 in order to advance the progress of the wellbore drilling. The efficiency of drilling and the forces on the drill bit 120 and the BHA 114 are affected by the position of the drill bit 120 relative to the bottom 124 of the wellbore 108. Depth of the drill bit 120 in the wellbore can be measured by the length of the drillstring 106 or other parameters at the surface 102, but in cases where the drill bit 120 experiences vibrations or non-idealities such as axial displacement, bending, stick-slip, etc. forces and loads transferred between the drill bit 120 and the bottom 124 of the wellbore 108 can vary in magnitude during drilling and the drill bit 120 can also experience fits and starts in rotational movement. The transfer of drilling energy from the drill bit 120 to a face of the wellbore 108 can be calculated based on measured forces experienced by the drill bit 120 or the drillstring 106. Weight on bit (WOB) is a measure of the force transferred axially to a terminus of the wellbore 108 and is traditionally measured in pounds (lbs) or thousands of pounds (1000 $1b$). Torque on bit (TOB) is a measure of the force transferred rotationally to a side or the terminus of the wellbore 108 and is traditionally measured in pound feet (lb ft). Rotational velocity of the drill bit is measured in rotations per minute (RPM). WOB, TOB, and RPM can be inferred at the surface 102 from remote measurements, such as hook load, mud flow, etc., or can be measured directly at the drill bit 120 or other locations on the drillstring 106 with embedded force measurement devices, such as the strain gauge 132.

The schematic diagram of the strain gauge 140 depicts the forces exerted on the drillstring 106 which are measured by the strain gauge 132 or another example strain gauge. Pressure, which is a force per unit area, is exerted on the outside of a drillstring component as a function of external pressure, flow rate and mud weight 142. Pressure is also exerted on the inside of the drillstring component as a function of internal pressure, flow rate, and mud weight 144. In the absence of additional axial and circumferential strain (i.e., strain caused by WOB) and additional torsional strain (i.e., strain caused by TOB), deformation of the drillstring component is a function of a net strain 146, which is a function of both the internal pressure and external pressure. In cases where no fluid is flowing through or around the drillstring component and where internal pressure and external pressure are equal, the net strain 146 is a function of the hydrostatic pressure. In cases where fluid is flowing, the internal pressure and external pressure are unequal and the net strain 146 is a function of the hydrodynamic pressure. Where the drillstring can be modelled as an elastic spring (i.e., in the linear displacement and proportional force regime), strain in the absence of WOB and TOB can be converted to a pressure—axial strain along the longitudinal axis of the drillstring, circumferential strain along the circumferential direction of the drillstring, etc. In a cylindrical coordinate system for a drillstring, the axial, radial, and circumferential directions can be considered orthogonal, where the circumferential direction can be generally tangential to a circumference of the drillstring and/or wellbore. Other strain models may also be used, where a relationship between displacement, deformation, and force is well-defined.

Hydrostatic pressure is a function of the weight of the fluid column present in the wellbore—where such weight is a function of the mass or density of the drilling mud (i.e., mud weight), height of the column of fluid (i.e., depth of the well), and gravitational force direction (which depends on the lateral and horizontal orientation of the well). Hydrostatic pressure is therefore indicative of well depth, inclination, and mud weight and qualitative determinations of wellbore conditions are made based on changes in hydrostatic pressure if multiple variables are unknown. If only one variable is unknown, it can be solved for using the relationship between hydrostatic pressure, mud weight, well depth, and inclination. As mud weight can change as a result of fluid influx or loss, and as well depth and inclination can vary from planned values or sensor determined values, hydrostatic pressure tracking via strain gauge measurements adds to downhole data collection. Hydrostatic pressure for a vertical fluid column can be calculated using Equation 1, below:

$$P = \rho g h \qquad (1)$$

where P is pressure, $\rho$ is fluid density, g is acceleration due to gravity, and h is fluid depth or the height of the fluid column. It should be understood that hydrostatic pressure calculations change due to applied pressure, wellbore inclination, fluid influx, etc. and that appropriate relationships for hydrostatic pressure will vary by application and wellbore geometry.

Because hydrostatic pressure is a function of the weight of a fluid column, hydrostatic pressure varies due to changes in values of fluid density (e.g., mud weight), depth (e.g., height of the fluid column), and wellbore inclination (where the gravitational force applied to a fluid column varies based on the direction of the column with respect to gravity). Hydrostatic pressure values and changes in values can therefore be used to monitor wellbore conditions and operations. For example, hydrostatic pressure is expected to increase linearly with depth in a vertical wellbore and deviations from a linear increase can reflect changes in mud weight or wellbore deviation from the vertical.

Hydrodynamic pressure is a function of drilling mud characteristics (e.g., mud weight, viscosity, density, diffusivity, etc.) and fluid flow rates. The pressure calculator extracts a factor representing a combined flow rate and mud weight from the calculated hydrodynamic pressure. With the extracted factor and additional surface data (such as average mud weight, drilling mud volume, mud density as a function of pressure, fluid throughput rate, mud motor speed, etc.), flow rate and mud weight values can be calculated. During drilling, the calculated flow rate and mud weight values are monitored and inform control and correction—where flow rates vary due to ball up, nozzle blockages, nozzles blow outs, etc. and mud weight varies due to fluid influx and loss. For strain gauges in communication with a drilling controller, such as at the surface, determination of hydrostatic and hydrodynamic pressure allows and improves real-time (or quasi-real-time or intermittent) trouble shooting for drill string components and control and correction of drilling operations. Hydrodynamic pressure can be calculated using Bernoulli's equations for incompressible flow, such as Equation 2 (below) if the drilling mud is approximately incompressible:

$$\frac{v^2}{2} + gz + \frac{P}{\rho} = \text{Constant} \tag{2}$$

where v is the fluid flow velocity at a point on a streamline, z is the elevation of the point above a reference plane, and the constant is of equal value for all points along a streamline. Other equations can be used to determine hydrodynamic pressure, including the Hagen-Poiseuille equation for laminar flow and general diffusion equations derived from on Fick's laws of diffusion. Appropriate hydrodynamic pressure calculation will vary based on wellbore geometry and drillstring geometry and flow characteristics—including flow characteristics encompassed by dimensionless numbers such as the Mach number, Reynolds number, etc.

Because hydrodynamic pressure is a function of the viscosity, density, flow rate, flow regime, and wellbore and drillstring geometry (i.e., tubular versus square), hydrodynamic pressure varies due to changes in values of fluid density (e.g., mud weight), fluid viscosity (e.g., mud composition where oil-based muds and water-based muds can vary in viscosity), wellbore and drillstring geometry (i.e., clearance between wellbore and drillstring which can be effected by drill bit gauge and/or wellbore deterioration), fluid speed (e.g., flow rate), etc. Hydrodynamic pressure values and changes in values can therefore be used to monitor wellbore conditions and operations. For example, hydrodynamic pressure is expected to decrease as flow rate decreases and an unexpected decrease in hydrodynamic pressure can correspond to a decrease in flow rate caused by a loss in drilling mud circulation (e.g., a loss of drilling mud to the formation).

The pressure calculator 150 operates on strain measurements obtained during a stand addition, component addition, or other pause in drilling. Drill pipe is added to the drillstring 106 in sections, called stands, where drilling and mud flow are paused during stand additions and the drillstring 106 is pulled of the bottom 128 of the wellbore 108. Drilling can be paused during the addition of each stand or any drillstring or wellbore component. Drilling can also be paused to switch or replace a drillstring, wellbore, or drilling rig component where no component is actually added to the drillstring. Drilling may also be paused to take one or more measurements (i.e., magnetometer, accelerometer, directional measurements, etc.) or transmit data (for example, nuclear magnetic resonance (NMR) data sets), where measurements can coincide with stand additions but can also be triggered independently of stand additions—such as to acquire or transmit higher quality or resolution data. Hereinafter "stand addition" should be understood to also encompass any pause in drilling or other off-bottom event during which WOB is substantially lower than during active drilling and during which mud flow and mud motor or drill bit rotation may or may not be paused, whether or not a stand or other component (e.g., drill collar, stabilizer, tool, etc.) is added to the drillstring. During the stand addition, the WOB approaches a local minimum and the TOB and the RPM approach approximately or substantially zero. The pressure calculator 150 can be located at the surface 102 or at the drill bit 120 or at another location within the wellbore 108. The pressure calculator 150 is in communication with the strain gauge 132 or part of the strain gauge 132. The pressure calculator 150 can operate in real time or operate based on strain measurements collected during a drilling run after the completion of the drilling run, such as when the strain gauge 132 is tripped out or otherwise removed from the wellbore 108.

A graph 152 depicts strain measurements obtained during a stand addition, where WOB is at a minimum (i.e., strain as a first approximation is due to pressure not WOB). The graph 152 depicts the portion of the stand addition where strain values 156 are due to hydrostatic pressure for a no flow off bottom regime 158. The graph 152 also depicts the portion of the stand addition where strain values 160 are due to hydrostatic and hydrodynamic pressure for an off bottom with mud flow regime 162.

The strain measurements of the graph 152 can be axial strain measurements (i.e., measurements of strain along the longitudinal axis of the drillstring), can be radial or circumferential strain measurements (i.e., measurements of strain along the radial axis of the drillstring or along the tangential direction of an outer radius of the drillstring), or can strain measurements for another axis or along a combination of axes. The strain measurements of the graph 152 can also be obtained from a strain gauge which can measure in more than one strain direction or along more than one axis, either at the same time or be moved to measure strain in different directions. Hereinafter "strain measurements" should be understood to encompass axial strain measurements, circumferential strain measurements, radial strain measurements, and combinations thereof.

The pressure calculator 150 identifies the strain values 156 (corresponding to the no flow and off bottom regime 158) and the strain values 160 (corresponding to the off bottom with mud flow regime 162) and determines pressure from the strain measurements based on a pre-determined relationship between strain and pressure for the drillstring and wellbore geometry. The pressure calculator determines the hydrostatic pressure 164 from the strain values 156. The pressure calculator determines the hydrostatic-and-hydrodynamic pressure 166 from the strain values 160. The hydrostatic-and-hydrodynamic pressure 166 can also be a total pressure or total pressure measurement—where hydrostatic pressure and hydrodynamic pressure together constitute substantially all pressure experienced in the wellbore. That is, the total pressure is the hydrostatic pressure and the hydrodynamic pressure when other contributions of pressure (such as atmospheric pressure, explosive pressure, surface pressure or surface tension, etc.) are negligible when compared to the hydrostatic pressure and hydrodynamic pressure. Based on the hydrostatic pressure 164 and the hydrostatic-and-hydrodynamic pressure 166, the pressure calculator 150 determines a value for a hydrodynamic pressure 168. The pressure calculator 150 can output the hydrostatic pressure 164 and one or both of the hydrostatic-and-hydrodynamic pressure 166 and the hydrodynamic pressure 168 to a controller or operator at the surface 102 during a drilling run, such as via fiber optic telemetry, acoustic (i.e., mud pulse) telemetry, etc. The pressure calculator 150 can also store in memory or communicate for storage in memory the hydrostatic pressure 164 and one or both of the hydrostatic-and-hydrodynamic pressure 166 and the hydrodynamic pressure 168 to a controller or operator at the surface 102 during a drilling run for post-drilling analysis. Alternatively, the pressure calculator 150 can operate at the surface 102 based on strain measurements communicated during a drilling run, such as via fiber optic telemetry, acoustic (i.e., mud pulse) telemetry, etc. or on strain measurements previously stored in memory.

The pressure calculator 150 can also identify various portions of the strain addition (such as the no flow and off bottom regime 158, the off bottom with mud flow regime 162, etc.) with a trained machine learning algorithm. The machine learning algorithm can be trained on one or more of WOB, TOB, and RPM measurements or strain measurements to identify stand additions and/or portions of stand additions based on the same measurements or fewer measurements. For example, the machine learning algorithm can be trained using supervised training to identify the no flow and off bottom regime 158 based on strain measurements, where the no flow and off bottom regime 158 in the training data is identified using both WOB and TOB measurements.

The pressure-based drilling monitor 180 can then determine a combined measure of flow rate and mud weight 170, based on the hydrodynamic pressure 168 or the hydrostatic-and-hydrodynamic pressure 166 and, optionally, the hydrostatic pressure 164. The pressure-based drilling monitor 180 can determine quantitative values for a mud weight 172 or a flow rate 174 based on additional information (where such additional information can be the flow rate 174 or the mud weight 172, respectively) or can detect a change in wellbore or wellbore operation status or condition based on the combined measure of flow rate and mud weight 170. The pressure-based drilling monitor 180 can operate on the hydrodynamic pressure 168 and/or the hydrostatic-and-hydrodynamic pressure 166 and, optionally, the hydrostatic pressure 164. The pressure-based drilling monitor 180 can operate proximate to the pressure calculator 150, such as at the drill bit 120 or at the surface 102. The pressure-based drilling monitor 180 can also operate at the surface 102 based on communications received from the pressure calculator 150, either during drilling or based on previously collected data. The pressure-based drilling monitor 180 can communicate to a controller or operator at the surface 102 during a drilling run, either from within the wellbore 108 or from another location at the surface 102. The pressure-based drilling monitor 180 can also be integrated within a controller or other processor at the surface 102.

Figure 2:
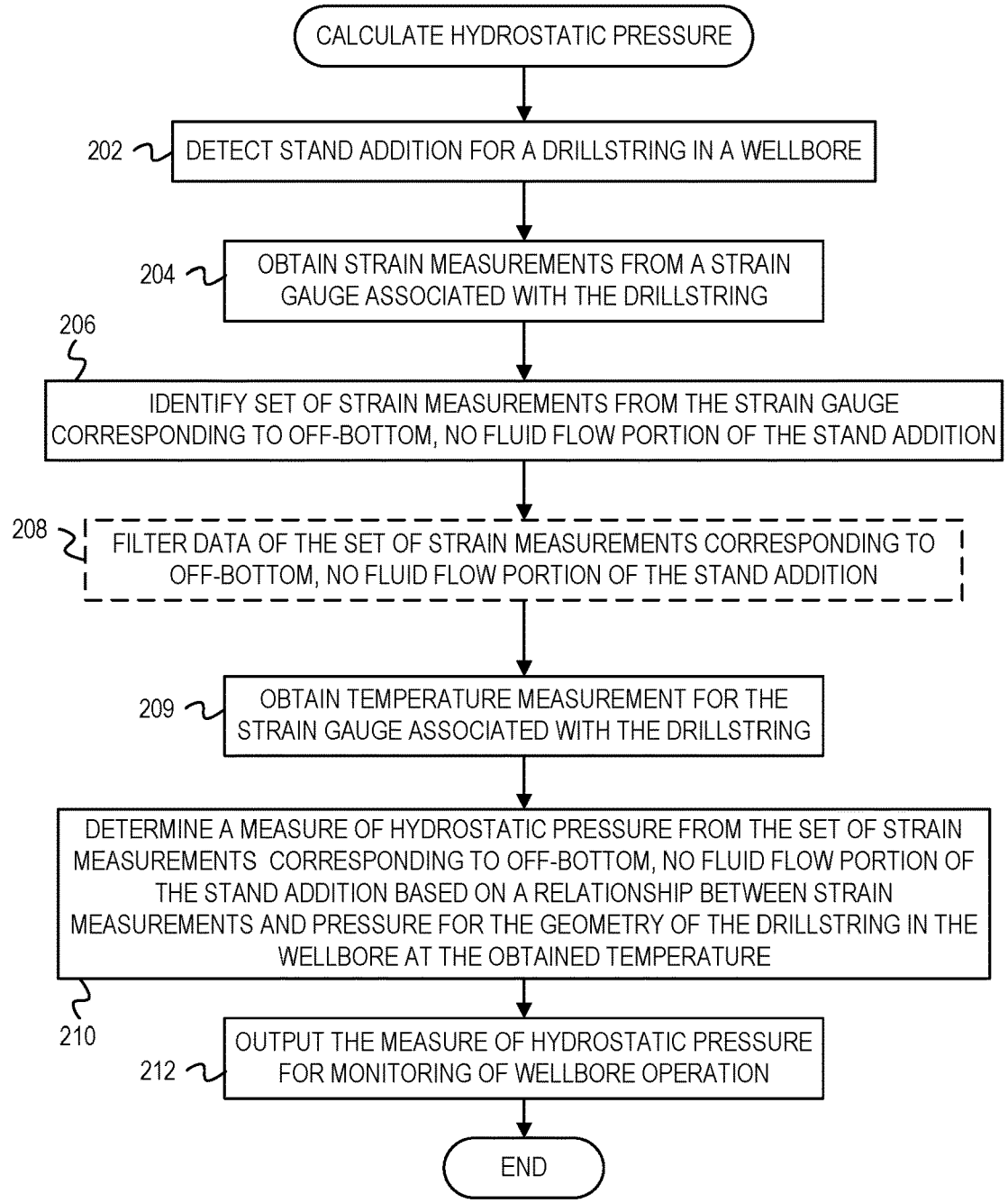
FIG. 2 depicts a flowchart of example operations for determining hydrostatic pressure at a location on a drillstring based on strain measurements.

FIG. 2 depicts a flowchart of example operations for determining hydrostatic pressure at a location on a drillstring based on strain measurements. The flowchart contains example operations described with reference to a pressure calculator for consistency with earlier figures. The name chosen for the program code is not to be construed as limiting on the claims. Structure and organization of a program can vary due to platform, programmer/architect preference, programming language, etc. In addition, names of code units (programs, modules, methods, functions, etc.) can vary for the same reason and be arbitrary.

At block 202, the pressure calculator detects a stand addition for a drillstring in a wellbore. The pressure calculator can detect the stand addition based on communication from a drilling operation controller, which may initiate or detect the stand addition and communicate to the pressure calculator that a stand addition is occurring, will occur, or has occurred. The drilling operator controller may also flag data, such as WOB, TOB, RPM, with a stand addition indicator, for both real time data and historical data. The pressure calculator can detect the stand addition based on WOB measurements and, optionally, TOB and RPM measurements, either in real time or based on historical data. The pressure calculator can determine the stand addition based on statistical or other analysis of the WOB measurements, such as detecting a local minimum or other feature corresponding to a stand addition or off-bottom event. The pressure calculator can also detect the stand addition based on a value threshold, a first derivative or other rate of change value, an average value, a standard deviation value, a bandwidth threshold for a rolling window of values, etc. determined from WOB measurements. The pressure calculator can detect the beginning of a stand addition, the beginning and end of a stand addition, or can detect individual portions of the stand addition separately—such as the no flow off bottom regime and the off bottom with mud flow regime. The pressure calculator can also detect stable measurements or a set of stable measurements corresponding to the stand addition or either of the regimes.

The pressure calculator can detect the stand addition based on analysis of WOB measurements in conjunction with TOB measurements and/or RPM measurements. The pressure calculator can determine the stand addition based on statistical or other analysis of the TOB measurements, such as detecting a local minimum where TOB measurements are substantially zero or another feature corresponding to the stand addition or off-bottom event. As TOB measurements are calibrated based on torsional strain detectors, TOB measurements may be greater than zero (or even negative) if calibrations are incorrectly applied. A substantially zero TOB measurement can therefore correspond to a local minimum or global minimum value for TOB that is not zero but can be approximately zero or zero to within a threshold. The pressure calculator can detect a range or set of times for which TOB measurements indicate a stand addition, and then identify WOB measurements corresponding to the stand addition based on measurement times. The pressure calculator can also use the TOB measurements to validate or invalidate a stand addition detected in WOB measurements. The pressure calculator can also detect the stand addition based on a value threshold, a first derivative or other rate of change value, an average value, a standard deviation value, a bandwidth threshold for a rolling window of values, etc. determined from TOB measurements.

The pressure calculator can determine the stand addition based on statistical or other analysis of the RPM measurements, such as detecting a local minimum where RPM measurements are substantially zero or detecting another feature corresponding to the stand addition or off-bottom event. As RPM measurements are calibrated based on rotational velocity sensors, RPM measurements may be greater than zero (or even negative) if calibrations are incorrectly applied. RPM measurements can also be greater than zero even if the drill bit is not being rotated, such as due to momentum from previous rotation. A substantially zero RPM measurement can therefore correspond to a local minimum or global minimum value for RPM that is not zero but can be approximately zero or zero to within a threshold. The pressure calculator can detect a range or set of times for which RPM measurements indicate a stand addition, and then identify WOB measurements corresponding to the stand addition based on measurement times. The pressure calculator can also use the RPM measurements to validate or invalidate a stand addition detected in WOB measurements, together with or in addition to the TOB measurements. The pressure calculator can also detect the stand addition based on a value threshold, a first derivative or other rate of change value, an average value, a standard deviation value, a bandwidth threshold for a rolling window of values, etc. determined from TOB measurements.

At block 204, the pressure calculator obtains strain measurements from a strain gauge associated with the drillstring. The pressure calculator can obtain strain measurements from the strain gauge for all available times or data points, or for only those times or data points associated with the stand addition. The pressure calculator can obtain strain measurements in any appropriate form or unit, such as voltages output by the strain gauge, as WOB measurements or other force measurements, etc. The pressure calculator can obtain WOB measurements from a strain gauge located at the drill bit (to identify a stand addition) and additional strain measurements from a strain gauge located at another point on the drillstring. If the pressure calculator obtains strain measurements from a strain gauge that does not measure WOB (or measures WOB at a location away from the drill bit), the pressure calculator can synchronize or otherwise correlate the strain measurements to WOB and/or other measurements used to identify the stand addition or the stand addition times.

At block 206, the pressure calculator identifies a set of strain measurements from the strain gauge corresponding to an off-bottom, no fluid flow portion of the stand addition. The pressure calculator can identify the set of strain measurements corresponding to the off-bottom, no fluid flow portion of the stand addition at the same time as the stand addition is detected, or can detect the set of strain measurements corresponding to the off-bottom, no fluid flow portion of the stand addition after a stand addition is identified. The pressure calculator can identify an off-bottom portion of the stand addition based on WOB measurements, such as by detecting a local minimum in the WOB measurements. The pressure calculator can identify a no fluid flow portion of the stand addition based on the RPM measurements of a drill bit, such as by detecting substantially zero RPM for a drill bit or mud motor pump. The pressure calculator can identify the set of strain measurements corresponding to the off-bottom, no fluid flow portion of the stand addition based on an overlap of the off-bottom and no fluid flow portions of the stand addition and based on one or more of the WOB, RPM, and TOB measurements.

The pressure calculator can also identify the set of strain measurements corresponding to the off-bottom, no fluid flow portion of the stand addition for which strain measurements are relatively stable. Relatively stable can comprise strain measurements for which a standard deviation or other variance is smaller than a predetermined threshold. Relatively stable can also comprise the set of strain measurements corresponding to the off-bottom, no fluid flow portion of the stand addition for which a rolling average is constant or for which the rolling mean is constant to within a stability threshold. The pressure calculator can identify the set of strain measurements corresponding to the off-bottom, no fluid flow portion of the stand addition and then remove strain measurements at the beginning and the end of the set for which values may be less stable. Variations in strain measurements can be caused by the drillstring decompressing (i.e., tension or flexion) after the drillstring is pulled off-bottom, or caused by a drill bit or mud motor starting up or ramping down.

At block 208, the pressure calculator optionally filters data of the set of strain measurements corresponding to the off-bottom, no fluid flow portion of the stand addition. The pressure calculator can filter the set of strain measurements to determine an average, mean, or mode strain value, or a range of strain values (for example, a mean strain value and a first standard deviation in the strain values). The pressure calculator can filter values negatively (i.e., remove values of the set) or positively (i.e., select values for the set). The pressure calculator can determine if one or more values of the set of strain measurements corresponding to the off-bottom, no fluid flow portion of the stand addition corresponds to noise or another non-pressure related effect—such as an unexpected weight transfer event like a collision with a side of the wellbore or touching down on the bottom of the wellbore. The pressure calculator can alternatively select a portion of the set of strain measurements corresponding to a stable or the most stable portion of the off-bottom, no fluid flow portion of the stand addition.

At block 209, the pressure calculator obtains a temperature measurement for the strain gauge associated with the drillstring. The pressure calculator can obtain one or more temperature measurements for the strain gauge, including temperature measurements obtained for all available times or data points, for only those times or data points associated with the stand addition, or an average temperature value for a time period or time window. The pressure calculator can obtain one or more temperature measurements for one or more locations on the drillstring, which can be proximate to the strain gauge. The pressure calculator can determine a stability factor for the temperature and obtain a number of temperature measurements based on the stability factor. For example, if the temperature measured at the location of the strain gauge is stable to a rate of within ±10° F./hour for several hours, a single temperature value can be used. In another example, if the temperature measure at the location of the strain gauge climbs rapidly once mud flow is halted during the stand addition (for example at a rate of 50° F./minute) then several temperature measurements can be used. The pressure calculator can obtain temperature measurements from a temperature gauge at or proximate to the strain gauge. The pressure calculator can obtain temperature measurements from temperature gauges surrounding the strain gauge and use interpolation to determine a temperature at the location of the strain gauge. The strain gauge itself can also include a temperature gauge, such as a resistive thermocouple or the like. The pressure calculator can obtain temperature measurements from inside or outside the drillstring. The pressure calculator can obtain temperature measurements from drilling fluid. The pressure calculator can determine a temperature measurement for the strain gauge based on thermodynamic or heat transfer equations. The pressure calculator can determine a bottom hole temperature based on the measure of temperature.

At block 210, the pressure calculator determines a measure of hydrostatic pressure from the set of strain measurements corresponding to the off-bottom, no fluid flow portion of the stand addition based on a relationship between strain measurements and pressure for the geometry of the drillstring in the wellbore at the obtained temperature. The relationship between strain measurements and pressure can be determined experimentally for a drillstring geometry (i.e., drill pipe diameter, drill pipe thickness, drillstring spring coefficient, etc.) and/or a wellbore geometry (i.e., wellbore diameter, casing type, inclination angle, etc.) at a given temperature. The relationship between strain measurements and pressure can be affected by the type of strain gauge and its location on the drillstring. Geometry is hereinafter understood to include drillstring and strain gauge physical factors which effect the relationship between pressure and strain measurements. An example relationship between strain measurements and pressure for a geometry will be further described in relationship to FIG. 8. The relationship between strain measurements and pressure can also be affected by temperature of the strain gauge, including a rate of change or stability of the temperature. The measure of hydrostatic pressure is a measure of pressure during the hydrostatic regime, which is the off-bottom, no fluid flow portion of the stand addition. The measure of hydrostatic pressure can be any measure of pressure associated with the hydrostatic regime.

The pressure calculator determines a measure of hydrostatic pressure based on a relationship between strain measurements, which can be measurements of voltage (e.g., strain gauge deformation voltage), measurements of current (e.g., piezoelectric current generated by strain) or measurements of force (e.g., WOB in pounds). The pressure calculator can determine a measure of hydrostatic pressure in units of force (where pressure is a force per area) or in units of pressure. In some instances, the measure of hydrostatic pressure can be a measure of pressure in units of voltage or current such as for tracking pressure changes.

The pressure calculator can determine a measure of hydrostatic pressure based on a relationship between the strain measurements or a value of the strain measurements (such as an average value, for example) and pressure for the geometry of the drillstring in the wellbore. Geometry of the wellbore can include wellbore diameter, drillstring inner diameter, drillstring outer diameter, drillstring length, drillstring liner, etc. The relationship between strain measurements and the measure of pressure can also vary based on a temperature at the strain gauge or an average temperature of the wellbore. In some cases, even though the relationship between axials strain measurements and the measure of pressure varies based on temperature, a constant temperature can be assumed, or temperature variations can be assumed to cause negligible changes in calculations of the measures of pressure.

At block 212, the pressure calculator outputs the measure of hydrostatic pressure for monitoring of a wellbore operation. The pressure calculator can output the measure of hydrostatic pressure to a surface drilling operator or controller. Optionally, the pressure calculator can output the measure of hydrostatic pressure if the measure of hydrostatic pressure falls outside a predetermined range or displays a change from a previous value greater than a predetermined threshold—i.e., the pressure calculator can trigger an alert for a set of predetermined hydrostatic pressure values. The pressure calculator can output the measure of hydrostatic pressure to storage or memory for retrieval after the completion of the drilling run. The pressure calculator can also compare a current measure of hydrostatic pressure to a measure of hydrostatic pressure calculated for a previous stand addition and store the measure of hydrostatic pressure for calculation of a measure of hydrodynamic pressure in the stand addition.

Figure 3:
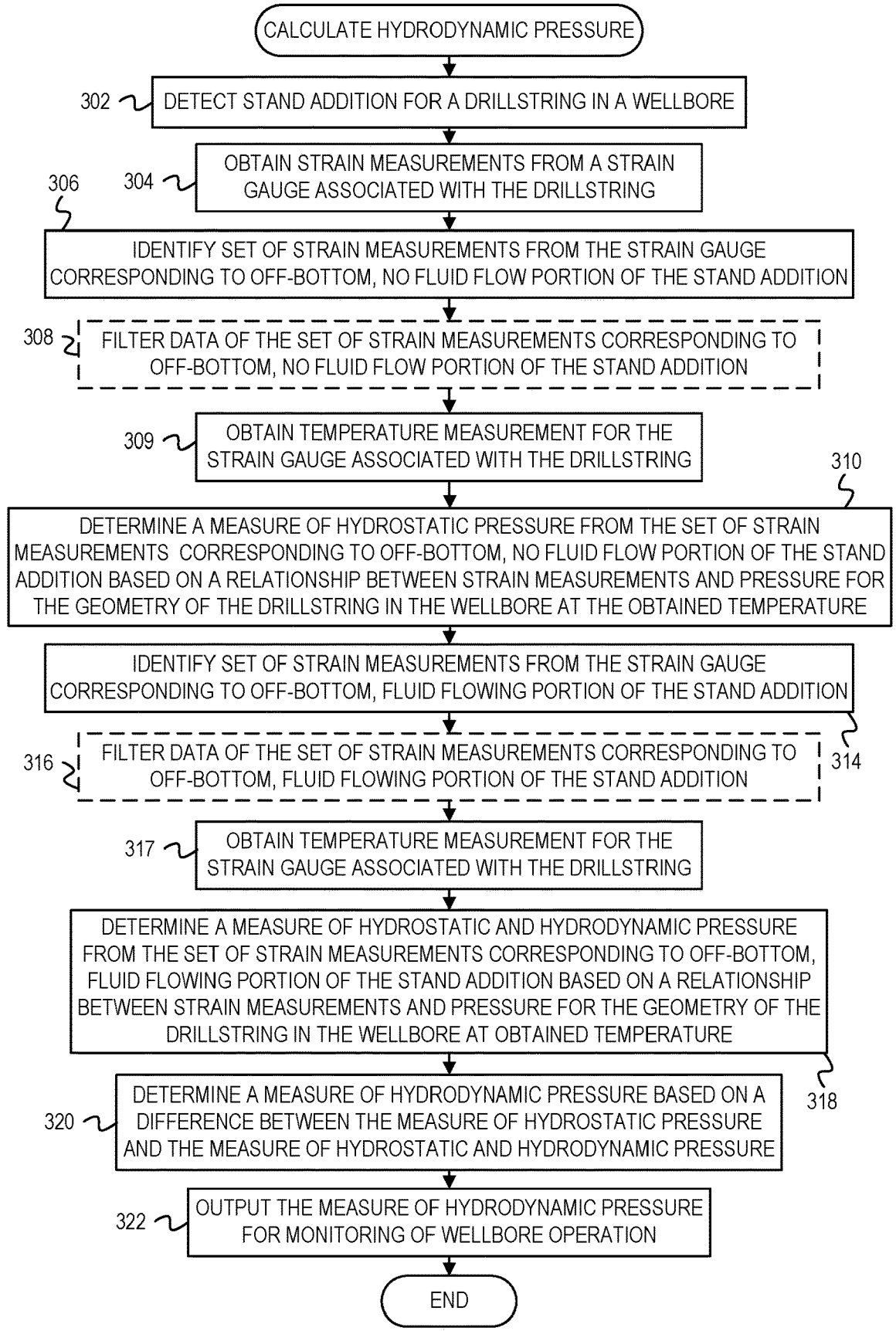
FIG. 3 depicts a flowchart of example operations for determining hydrodynamic pressure at a location on a drillstring based on strain measurements.

FIG. 3 depicts a flowchart of example operations for determining hydrodynamic pressure at a location on a drillstring based on strain measurements. The flowchart contains example operations described with reference to a pressure calculator for consistency with earlier figures. The operations for blocks 302, 304, 306, 308, 309, and 310 are similar to the operations for blocks 202, 204, 206, 208, 209, and 210, respectively.

At block 302, the pressure calculator detects a stand addition for a drillstring in a wellbore.

At block 304, the pressure calculator obtains strain measurements from a strain gauge associated with the drillstring.

At block 306, the pressure calculator identifies a set of strain measurement from the strain gauge corresponding to an off-bottom, no fluid flow portion of the stand addition.

At block 308, the pressure calculator optionally filters data of the set of strain measurements corresponding to the off-bottom, no fluid flow portion of the stand addition.

At block 309, the pressure calculator obtains a temperature measurement for the strain gauge associated with the drillstring.

At block 310, the pressure calculator determines a measure of hydrostatic pressure from the set of strain measurements corresponding to the off-bottom, no fluid flow portion of the stand addition based on a relationship between strain measurements and pressure for the geometry of the drillstring in the wellbore at the obtained temperature.

At block 314, the pressure calculator identifies a set of strain measurements from the strain gauge corresponding to an off-bottom, fluid flowing portion of the stand addition. The pressure calculator can identify the set of strain measurements corresponding to the off-bottom, fluid flowing portion of the stand addition at the same time as the stand addition is detected, or can detect the set of strain measurements corresponding to the off-bottom, fluid flowing portion of the stand addition after a stand addition is identified. The pressure calculator can identify the off-bottom, fluid flowing portion of the stand addition while also identifying the off-bottom, no fluid flowing portion of the stand addition, such as in block 306. The pressure calculator can identify an off-bottom portion of the stand addition based on WOB measurements, such as by detecting a local minimum in the WOB measurements. The pressure calculator can identify the fluid flowing portion of the stand addition based on the RPM measurements of a drill bit, such as by detecting a non-zero RPM for a drill bit or mud motor pump. The pressure calculator can also identify the fluid flowing portion of the stand addition or the start of the fluid flowing portion of the stand addition based on an abrupt increase in RPM and/or TOB corresponding to a ramp up of a drill bit or mud motor pump. The pressure calculator can identify the set of strain measurements corresponding to the off-bottom, fluid flowing portion of the stand addition based on an overlap of the off-bottom and fluid flowing portions of the stand addition and based on one or more of the WOB, RPM, and TOB measurements.

The pressure calculator can also identify the set of strain measurements corresponding to the off-bottom, fluid flowing portion of the stand addition for which strain measurements are relatively stable. Relatively stable strain measurements can be strain measurements for which a standard deviation or other variance is smaller than a predetermined threshold. Relatively stable strain measurements can be the set of strain measurements corresponding to the off-bottom, fluid flowing portion of the stand addition for which a rolling average is constant or for which the rolling mean is constant to within a stability threshold. The pressure calculator can identify the set of strain measurements corresponding to the off-bottom, fluid flowing portion of the stand addition and then remove strain measurements at the beginning and the end of the set for which values may be less stable.

At block 316, the pressure calculator optionally filters data of the set of strain measurements corresponding to the off-bottom, fluid flowing portion of the stand addition. The pressure calculator can filter the set of strain measurements to determine an average, mean, or mode strain value, or a range of strain values (for example, a mean strain value and a first standard deviation in the strain values). The pressure calculator can filter values negatively or positively. The pressure calculator can determine if one or more values of the set of strain measurements corresponding to the off-bottom, fluid flowing portion of the stand addition corresponds to noise or another non-pressure related effect. The pressure calculator can alternatively select a portion of the set of strain measurements corresponding to a stable or most stable portion of the off-bottom, fluid flowing portion of the stand addition. As an example, the pressure calculator can select a subset of the set of strain measurements corresponding to the off-bottom, fluid flowing portion of the stand addition for which a rolling average increases less than a threshold.

At block 317, the pressure calculator obtains a temperature measurement for the strain gauge associated with the drillstring. The pressure calculator can alternatively use the temperature measurement obtained at block 309. The pressure calculator can obtain one or more temperature measurements for the strain gauge over the course of the stand addition. The pressure calculator can determine whether the temperature measurement previously obtained is still applicable, such as by determining a rate of temperature change or a temperature stability. For example, the pressure calculator can determine that the rate of temperature change is higher than a threshold and obtain a new temperature measurement or the pressure calculator can determine that the rate of change is lower than the threshold and use a previously obtained temperature measurement. The pressure calculator can obtain the temperature measurement as previously described in relation to block 209 of FIG. 2.

At block 318, the pressure calculator determines a measure of hydrostatic-and-hydrodynamic pressure from the set of strain measurements corresponding to the off-bottom, fluid flowing portion of the stand addition based on a relationship between strain measurements and pressure for the geometry of the drillstring in the wellbore at the obtained temperature. The measure of hydrostatic-and-hydrodynamic pressure is a measure of pressure during the hydrodynamic regime, which is the off-bottom, fluid flowing portion of the stand addition. The measure of hydrostatic-and-hydrodynamic pressure can be any measure of pressure associated with the hydrodynamic regime. The pressure calculator determines a measure of hydrostatic-and-hydrodynamic pressure based on a relationship between strain measurements, which is the same relationship used to determine a measure of hydrostatic pressure in block 310 (and as previously described with reference to block 210).

At block 320, the pressure calculator determines a measure of hydrodynamic pressure based on a difference between the measure of hydrostatic pressure and the measure of hydrostatic-and-hydrodynamic pressure. The measure of hydrodynamic pressure is a measure of a change in pressure between the hydrostatic regime, which is the off-bottom, no fluid flow portion of the stand addition, and the hydrodynamic regime, which is the off-bottom, fluid flowing portion of the stand addition. The measure of hydrodynamic pressure can be any measure of pressure associated with the hydrodynamic regime.

The pressure calculator determines a measure of hydrodynamic pressure based on a difference between the measure of hydrostatic pressure and the measure of hydrostatic-and-hydrodynamic pressure, which can be determined in any comparable units such as voltage, current, lbs, psi, etc. The relationship between the strain measurements and pressure for the geometry of the drillstring in the wellbore can be temperature dependent. The pressure calculator can determine a measure of hydrostatic pressure for a first temperature (e.g., in force or pressure units) and a measure of hydrostatic-and-hydrodynamic pressure for a second temperature (e.g., also in force or pressure units) and thereby determine a measure of hydrodynamic pressure from their difference that is temperature independent, where measures of pressure in voltage or current units may contain temperature dependence.

At block 322, the pressure calculator outputs the measure of hydrodynamic pressure for monitoring of a wellbore operation. The pressure calculator can output the measure of hydrodynamic pressure to a surface drilling operator or controller. Optionally, the pressure calculator can output the measure of hydrodynamic pressure if the measure of hydrodynamic pressure falls outside a predetermined range or displays a change from a previous value or from a measure of hydrostatic pressure greater than a predetermined threshold—i.e., the pressure calculator can trigger an alert for a set of predetermined hydrodynamic pressure values. The pressure calculator can output the measure of hydrodynamic pressure to storage or memory for retrieval after the completion of the drilling run. The pressure calculator can also compare a current measure of hydrodynamic pressure to a measure of hydrodynamic pressure calculated for a previous stand addition. The pressure calculator can also output the measure of hydrostatic pressure and/or the measure of hydrostatic-and-hydrodynamic pressure with the measure of hydrodynamic pressure.

Figure 4:
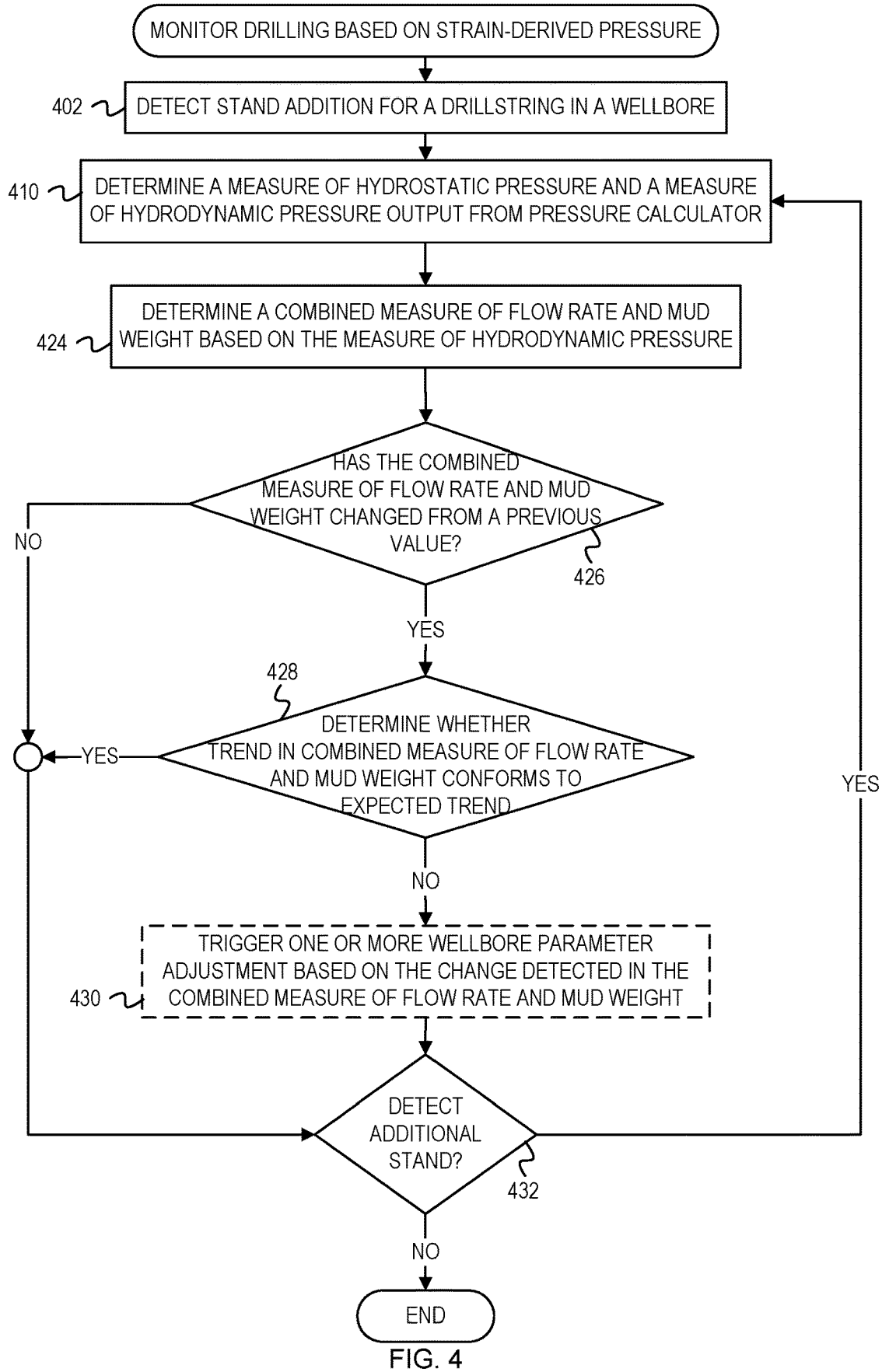
FIG. 4 depicts a flowchart of example operations for monitoring drilling operations based on hydrodynamic pressure determinations.

FIG. 4 depicts a flowchart of example operations for monitoring drilling operations based on hydrodynamic pressure determinations. The flowchart contains example operations described with reference to a pressure-based drilling monitor for consistency with earlier figures. The name chosen for the program code is not to be construed as limiting on the claims. Structure and organization of a program can vary due to platform, programmer/architect preference, programming language, etc. In addition, names of code units (programs, modules, methods, functions, etc.) can vary for the same reason and be arbitrary.

At block 402, the pressure-based drilling monitor detects a stand addition for a drillstring in a wellbore. The pressure-based drilling monitor can detect a stand addition as previously described with respect to block 202. The pressure-based drilling monitor can alternatively detect a stand based on a trigger or data tag from the pressure calculator.

At block 410, the pressure-based drilling monitor determines a measure of hydrostatic pressure and a measure of hydrodynamic pressure output from a pressure calculator. As previously described with reference to FIG. 2 and FIG. 3, a pressure calculator determines these measures of pressure based on strain measurements from a strain gauge associated with the drillstring. The functionality of the pressure calculator can be implemented as part of the pressure-based drilling monitor or can be separate from the pressure-based drilling monitor.

At block 424, the pressure-based drilling monitor determines a combined measure of flow rate and mud weight based on the measure of hydrodynamic pressure. The pressure-based drilling monitor determines the combined measure of flow rate and mud weight based on one or more equations for hydrodynamic pressure, such as Eq. 2. Hydrodynamic pressure depends on both fluid density and flow rate, which allows the pressure-based drilling monitor to calculate the combined measure of flow rate and mud weight based on the hydrodynamic pressure. The pressure-based drilling monitor can use the measure of hydrodynamic pressure as the combined measure of flow rate and mud weight, or the pressure-based drilling monitor can perform one or more mathematical operation or transform to generate the combined measure of flow rate and mud weight based on the measure of hydrodynamic pressure. For example, in a laminar flow regime an average flow rate can be related to an average density using Poiseuille's law and viscosity.

At block 426, the pressure-based drilling monitor determines if the combined measure of flow rate and mud weight has changed from a previous value. The pressure-based drilling monitor can compare the combined measure of flow rate and mud weight to a previously determined combined measure of flow rate and mud weight. The pressure-based drilling monitor can compare the combined measure of flow rate and mud weight to a threshold or predetermined value if no previously determined combined measure of flow rate and mud weight is available or accessible. The pressure-based drilling monitor can determine that the combined measure of flow rate and mud weight has changed if the values are different or if the difference in values exceeds a threshold. If the pressure-based drilling monitor determines that the combined measure of flow rate and mud weight has changed, flow continues to block 428. Otherwise, flow continues to block 432.

At block 428, the pressure-based drilling monitor determines whether the trend in the combined measure of flow rate and mud weight conforms to an expected trend. The pressure-based drilling monitor can determine that an increase in the combined measure of flow rate and mud weight corresponds to an expected change in the wellbore operation—such as an increase in the flow rate, an increase in mud weight, etc. The pressure-based drilling monitor can determine that a decrease in the combined measure of flow rate and mud weight corresponds to an expected change in the wellbore operation—such as a decrease in the flow rate, a decrease in the mud weight, etc.

The pressure-based drilling monitor can also determine that the change in the combined measure of flow rate and mud weight corresponds to an unexpected wellbore operation or event. The pressure-based drilling monitor can determine that an increase in the combined measure of flow rate and mud weight corresponds to one or more of an unexpected increase in the flow rate, such as due to a formation fluid influx, an increase in the mud weight, such as due to a breakdown of a formation and infiltration of debris, a nozzle or other fluid flow element experiencing a blockage or ball up, an increase in formation pressure, etc. The pressure-based drilling monitor can determine that a decrease in the combined measure of flow rate and mud weight corresponds to one or more of an unexpected decrease in the flow rate, such as due to a loss of drilling fluid to the formation, a decrease in the mud weight, such as due to an influx of gas from the formation, a nozzle or other fluid flow element washing out or becoming lost, a decrease in formation circulation, etc.

The pressure-based drilling monitor can communicate the change or the direction of the change in the combined measure of flow rate and mud weight to a surface-based controller or operator, or can communicate warnings or alerts based on possible causes of the change based on the direction of the change in the combined measure of flow rate and mud weight. If operating on historical data, the pressure-based drilling monitor can correlate wellbore events present in other data to changes in the combined measure of flow rate and mud weight. The pressure-based drilling monitor can determine the specific cause of the change in the combined measure of flow rate and mud weight, based on information from one or more drilling sensor—including mud weight, flow rate, influx, outflow, cutting size, temperature, etc. sensors.

At block 430, the pressure-based drilling monitor optionally triggers one or more wellbore parameter adjustment based on the change detected in the combined measure of flow rate and mud weight. The pressure-based drilling monitor can trigger a change directly or alert a surface-based controller or operator that a wellbore parameter is to be adjusted based on a detected wellbore event. For example, the pressure-based drilling monitor can trigger an increase in mud weight via a change in drilling fluid in response to a detected decrease in mud weight caused by a formation gas influx.

At block 432, the pressure-based drilling monitor determines if an additional stand is detected. The pressure-based drilling monitor can also detect an additional stand based on an additional trigger from the pressure calculator or based on receipt of an additional measure of hydrostatic pressure or hydrodynamic pressure. If an additional stand is detected, flow continues to block 410 where the pressure-based drilling monitor determines a measure of hydrostatic pressure for the additional stand.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 206 and 208 can be performed in parallel or concurrently. With respect to FIG. 2, data filtration is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

Figure 5A:
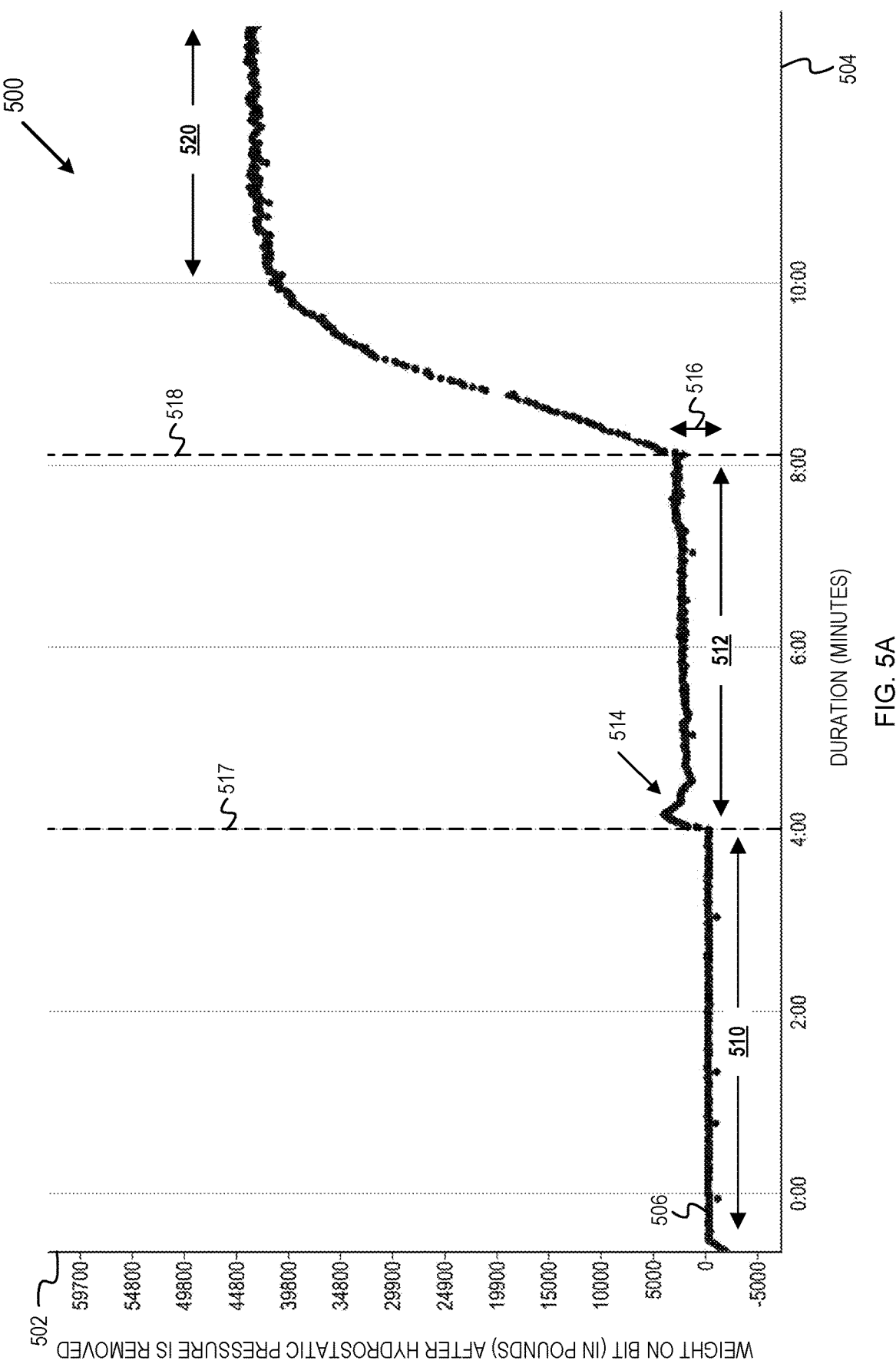
FIGS. 5A, 5B, and 5C depict graphs corresponding to tared strain measurements, torque measurements, and rotational velocity measurements acquired at a drill bit during addition of a stand.
Figure 5B:
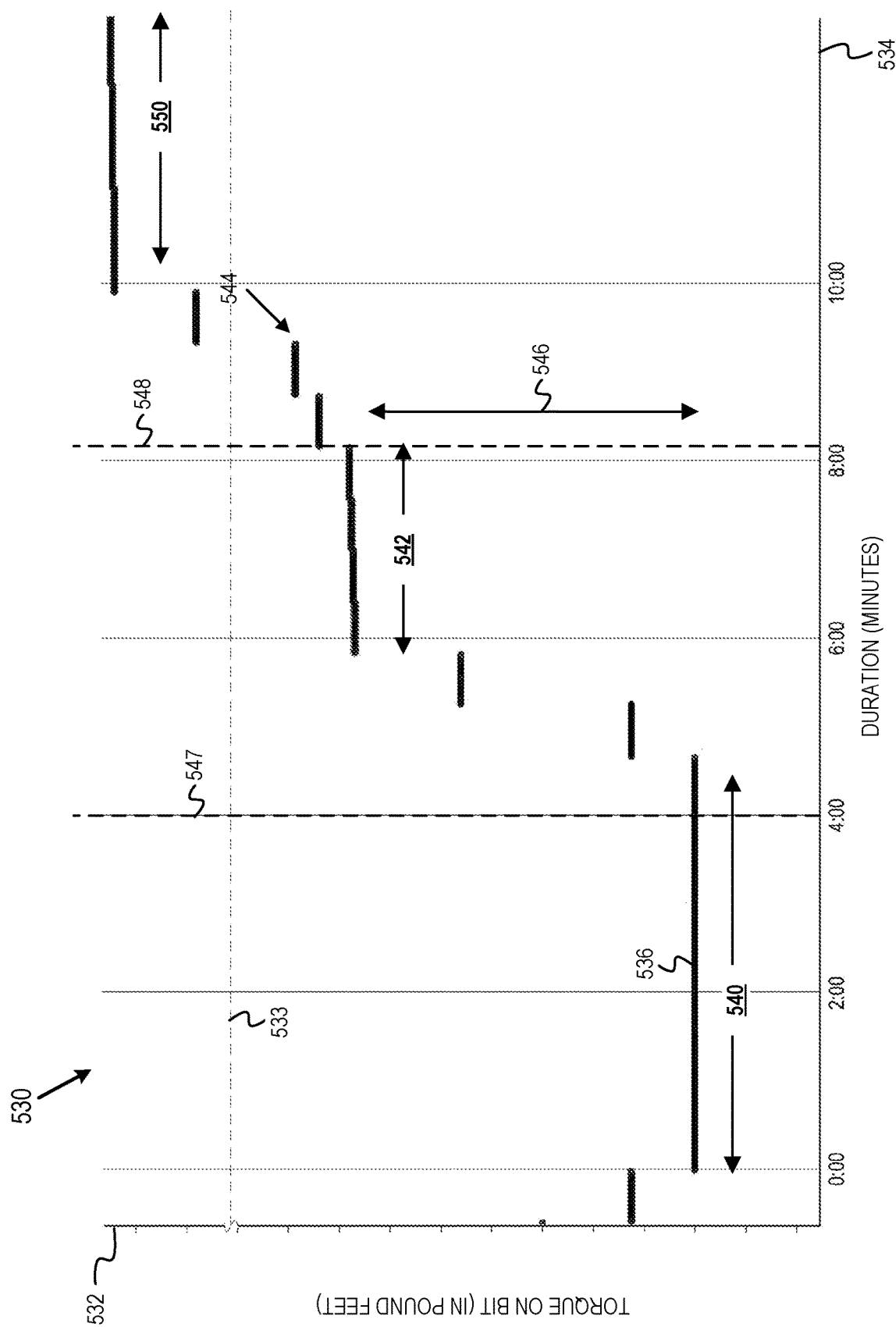
Figure 5C:
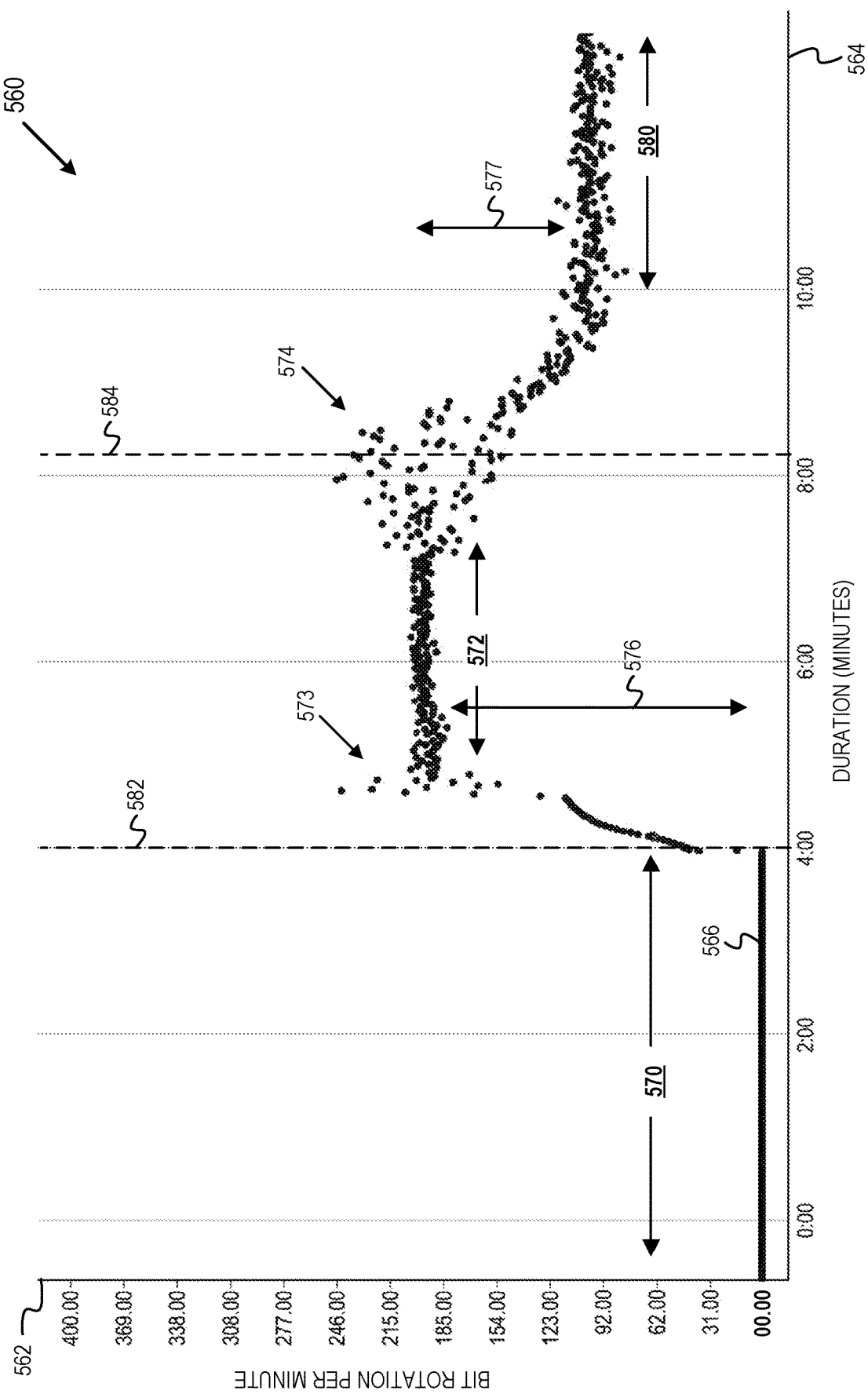

FIGS. 5A, 5B, and 5C depict graphs corresponding to tared strain measurements, torque measurements, and rotational velocity measurements acquired at a drill bit during addition of a stand. FIG. 5A depicts a graph 500 displaying weight on bit (WOB) in pounds after hydrostatic pressure is removed along y-axis 502 as a function of time along x-axis 504. The graph 500 depicts WOB values that have been zeroed or tared to remove hydrostatic pressure during the stand addition, in order to improve calculation of WOB during drilling (i.e., during the portions of drilling where the drill bit is drilling, outside of stand additions). Taring and zeroing includes any setting or resetting of a measurement to a zero-value based on a reference point. A line 506 is formed by dots representing tared values of WOB determined from a strain gauge for a drillstring in a wellbore during various portions of a stand addition.

During the time period covered by an arrow 510, the drillstring is in the off-bottom, no fluid flow portion of the stand addition. The arrow 510 identifies values of WOB that are substantially zero, where the WOB values have been tared to remove hydrostatic pressure from the WOB measurements. During the time period covered by an arrow 512, the drillstring is in the off-bottom, fluid flowing portion of the stand addition. The arrow 512 identifies values of WOB that are relatively steady, except for a peak 514. The graph 500 displays WOB values which have been tared to remove the hydrostatic pressure (e.g., WOB measurements corresponding to the arrow 510) and therefore displays increases in pressure from the hydrostatic pressure during subsequent time periods (i.e., time periods after those identified by the arrow 510). The peak 514 represents an increase in WOB measurements due to a contribution from hydrodynamic pressure. The decrease in the peak 514 is a function of stabilization of WOB which occurs after a surge due to the initial fluid flow as the pumps turn on. The arrow 512 identifies values that have been incompletely zeroed to remove hydrodynamic pressure from the WOB measurements, where the values are not substantially zero due to incomplete taring of values. The WOB values are instead represented by an arrow 516, which corresponds to the WOB contribution from hydrodynamic pressure after the contribution from hydrostatic pressure is removed.

A dashed line 517 represents the time at which fluid flow begins, and which separates the hydrostatic regime of the arrow 510 form the hydrostatic-and-hydrodynamic regime of the arrow 512. A dashed line 518 represents the time at which the drill bit is brought back into contact with the bottom of the wellbore (e.g., pick up of WOB). The line 506 increases as WOB is added back onto the drillstring, until at a time period identified by an arrow 520 the WOB on the drillstring reaches a steady state.

FIG. 5B depicts a graph 530 displaying torque on bit (TOB) along y-axis 532 as a function of time along x-axis 534. The graph 530 depicts TOB values during the stand addition, which can be used to identify regions and/or portions of the stand addition. A line 536 is formed by dots representing TOB determined from a torsional strain gauge (or another sensor) for a drillstring in a wellbore during various portions of a stand addition.

During the time period covered by an arrow 540, the drillstring is in the off-bottom, no fluid flow portion of the stand addition. The arrow 540 identifies values of TOB that correspond to a local minimum, where fluid is not flowing and the drill bit and/or mud motor are not rotating and creating torque on the bit. During the time period covered by an arrow 542, the drillstring is in the off-bottom, fluid flowing portion of the stand addition. The arrow 542 identifies values of TOB that are relatively steady, except for a peak 544. The peak 544 represents an increase in TOB measurements due to a touchdown of the drill bit as it is brought back into contact with the wellbore bottom. The arrow 546 represents an increase in TOB between the off-bottom, no fluid flow and off-bottom, fluid flowing portions of the stand addition.

A dashed line 547 represents the time at which fluid flow begins, and which separates the hydrostatic regime of the arrow 540 form the hydrostatic-and-hydrodynamic regime of the arrow 542. A dashed line 548 represents the time at which the drill bit is brought back into contact with the bottom of the wellbore, or pick up of WOB. After the drillstring comes back into contact with the bottom (during the time period covered by an arrow 550), the TOB increases to a value indicated by the arrow 544 and then increases substantially to return to a steady state value for drilling (e.g., the steady state value indicated by an arrow 550). It should be understood that the values indicated by the arrow 544 and the arrow 550 are different enough (such that the value indicated by the arrow 550 is much larger than the value indicated by the arrow 544 and can be orders of magnitude larger) that they are separated by a break 533 in the y-axis corresponding to TOB in order to allows such values to be plotted on a single graph while preserving the information contained in the TOB for off-bottom portions of the stand addition.

FIG. 5C depicts a graph 560 displaying drill bit rotation per minute (RPM) along y-axis 562 as a function of time along x-axis 564. The graph 560 depicts RPM values during the stand addition, which can be used to identify regions and/or portions of the stand addition. A line 566 is formed by dots representing RPM determined from a rotational velocity sensor (or another sensor) for a drillstring in a wellbore during various portions of a stand addition.

During the time period covered by an arrow 570, the drillstring is in the off-bottom, no fluid flow portion of the stand addition. The arrow 570 identifies values of RPM that are substantially zero. During the time period covered by an arrow 572, the drillstring is in the off-bottom, fluid flowing portion of the stand addition. The arrow 572 identifies values of RPM that are relatively steady about an RPM value represented by an arrow 576, except for peaks 573 and 574. The peak 573 represents an increase in RPM due to ramp up of a drill bit or mud motor as fluid begins to flow through the drillstring. The peak 574 represents an increase in RPM measurements due to touchdown of the drill bit as it is brought back into contact with the wellbore bottom. The peak 574 can also represent a measurement artifact and may not correspond to an actual RPM increase.

A dashed line 582 represents the time at which fluid flow begins, and which separates the hydrostatic regime of the arrow 570 form the hydrostatic-and-hydrodynamic regime of the arrow 572. A dashed line 584 represents the time at which the drill bit is brought back into contact with the bottom of the wellbore, or pick up of WOB. After the drillstring comes back into contact with the bottom, the RPM returns to a steady state value smaller than that off the off-bottom, fluid flowing regime as represented by an arrow 577.

Figure 6A:
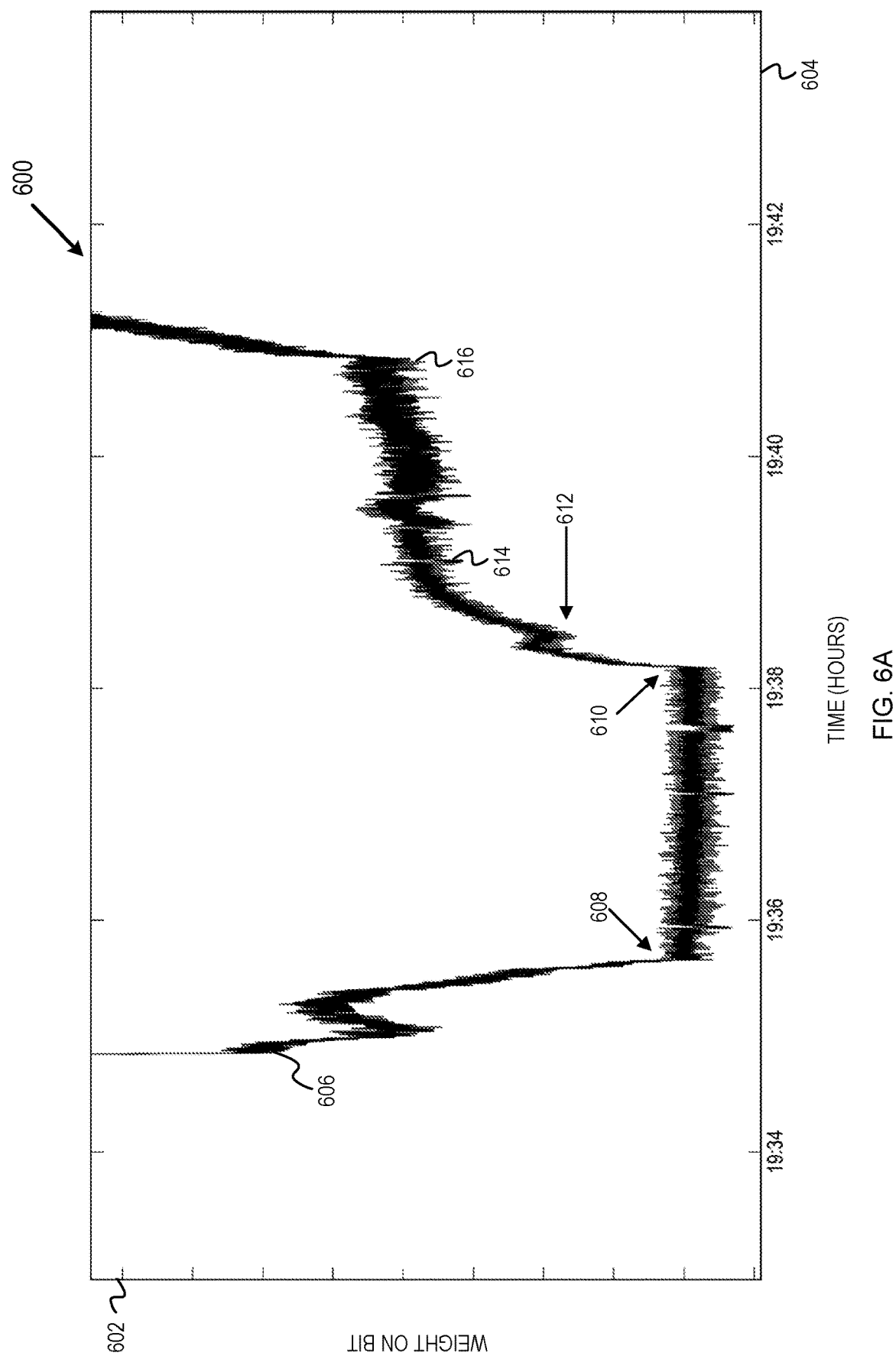
FIGS. 6A, 6B, and 6C depict graphs corresponding to strain measurements, torque measurements, and rotational velocity measurements acquired at a drill bit during addition of a stand.
Figure 6B:
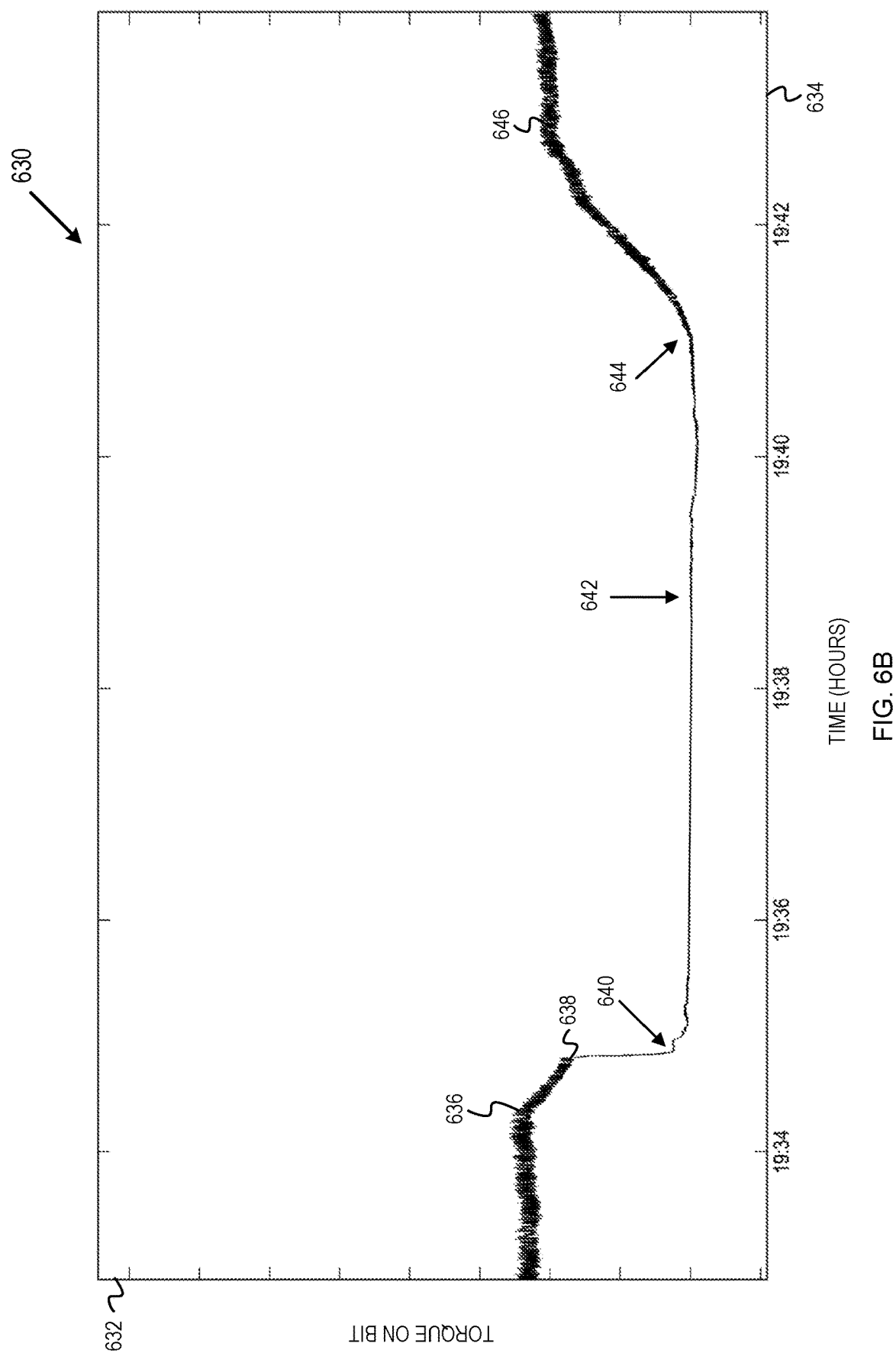
Figure 6C:
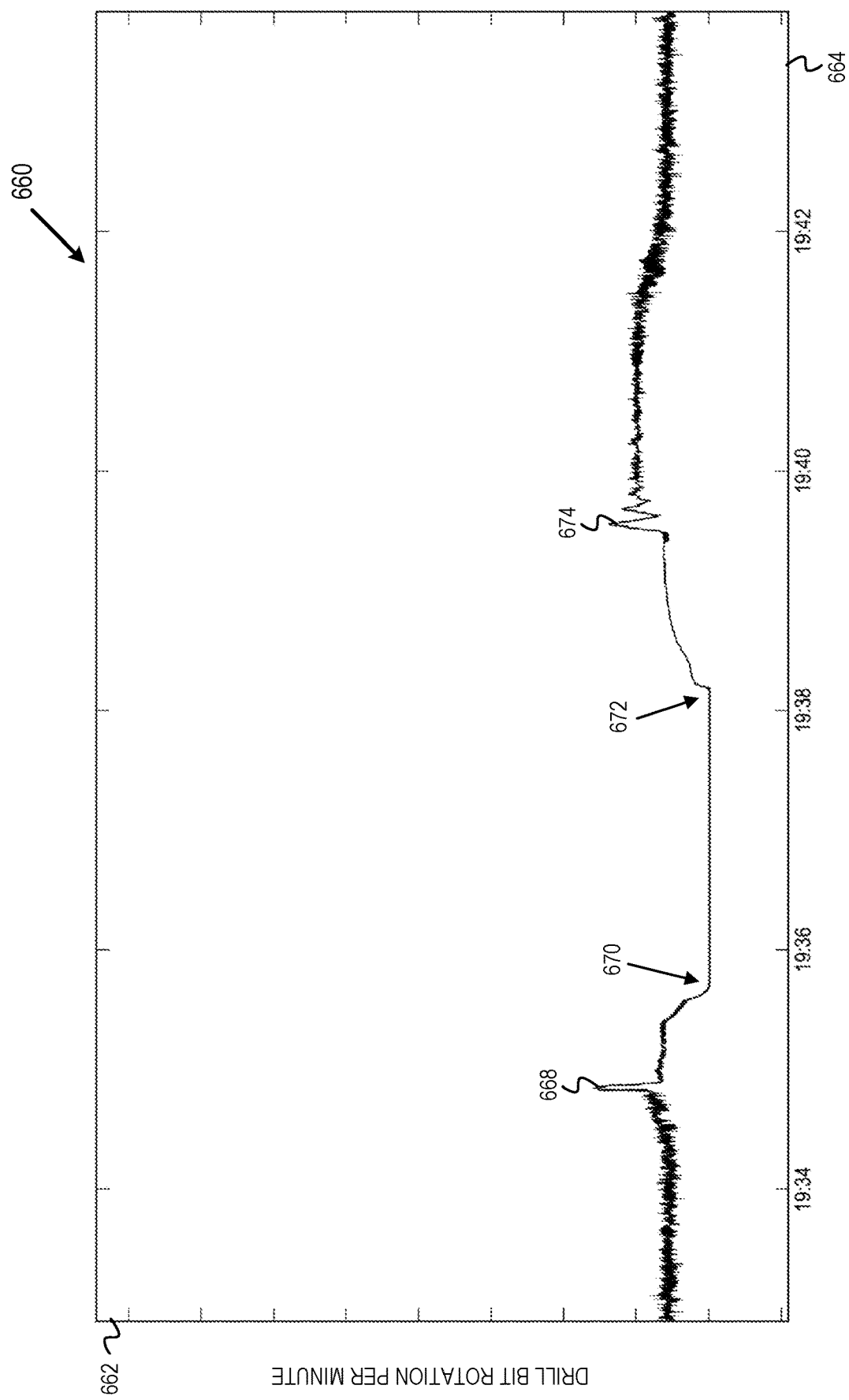

FIGS. 6A, 6B, and 6C depict graphs corresponding to strain measurements, torque measurements, and rotational velocity measurements acquired at a drill bit during addition of a stand. FIG. 6A depicts a graph 600 displaying weight on bit (WOB) along y-axis 602 as a function of time along x-axis 604. The graph 600 depicts as collected WOB values which have not been adjusted, zeroed, or tared. During the stand addition, the WOB drops from a WOB associated with drilling (e.g., in the tens of thousands of pounds) to a WOB associated with an off-bottom drillstring. A point 606 corresponds to a sharp (i.e., nearly vertical) decrease in WOB consistent with a drillstring being pulled off-bottom during a stand addition. A point 608 corresponds to an inflection point in the WOB, where the decrease in WOB halts as a minimum or local minimum is reached. A point 610 corresponds to a second inflection point, where WOB begins to increase as drilling fluid flow resumes during the stand addition. The point 610 corresponds to the pumps restarting during the stand addition. Between the point 608 and the point 610, WOB maintains an approximately steady state value at the local minimum. This WOB value corresponds to those strain measurements which are used to determine hydrostatic pressure for the off-bottom, no fluid flow regime. An arrow 612 points to a sharply increasing portion of WOB. The WOB increases as the pumps ramp up due to a changing fluid flow and corresponding increase in hydrodynamic pressure. A point 614 corresponds to full flow through the pumps of the drillstring—which generates maximum fluid flow. A point 616 corresponds to the drillstring tagging the bottom of the wellbore, i.e., where the drillstring assumes WOB as the drill bit comes into contact with the bottom of the wellbore. After the point 616 WOB increases sharply (e.g., almost vertically) as WOB increases to a WOB associated with drilling.

FIG. 6B depicts a graph 630 displaying torque on bit (TOB) along y-axis 632 as a function of time along x-axis 634. The graph 630 depicts as collected TOB values which have not been adjusted. During the stand addition, the TOB drops from a TOB associated with drilling to a minimum TOB associated with an off-bottom drillstring. The minimum TOB can be substantially zero, or can be another local minimum. The minimum value of TOB can vary based on sensor location, zeroing, calibration, etc. and on drillstring conditions, such as minimum flow rate, clearance between drill bit and wellbore wall, etc. A point 636 corresponds to a decrease in TOB consistent with a drillstring being pulled off-bottom during a stand addition. A point 636 corresponds to an inflection point which occurs as pumps (i.e., drill bit pumps and/or mud motor pumps) are turned off or otherwise ramped down. After the point 636, TOB decreases rapidly towards a local minimum, reached at an inflection point 640 where the drill bit is in slip (i.e., not engaged torsionally with the wellbore). The local minimum TOB value continues to a point indicated by an arrow 642. The arrow 642 corresponds to the restarting or ramping up off the one or more pumps of the drillstring. The TOB value as the pumps restart remains at the local minimum, but variance within the TOB values increases. A point 644 corresponds to the drillstring tagging the bottom of the wellbore, i.e., where the drillstring assumes WOB as the drill bit comes into contact with the bottom of the wellbore. From the point 644, TOB increases to a steady state, reached at a point 626, which is the TOB value associated with drilling.

FIG. 6C depicts a graph 660 displaying drill bit rotations per minute (RPM) along y-axis 662 as a function of time along x-axis 664. The graph 660 depicts as collected RPM values which have not been adjusted. During the stand addition, the RPM drops from an RPM associated with drilling to a minimum RPM associated with an off-bottom drillstring. The minimum RPM can be substantially zero or can be another local minimum. The minimum value of RPM can vary based on sensor location, zeroing, calibration, etc. and on drillstring conditions, such as minimum flow rate, clearance between drill bit and wellbore wall, rotational friction of the drill bit, etc. A peak 668 corresponds to an increase in RPM associated with a drillstring being pulled off-bottom during a stand addition. The peak represents a faster rotation which occurs as WOB and TOB decrease when the drill bit disengages from the bottom of the wellbore. After the peak 668, RPM decreases as the pumps are turned off or ramped down until a minimum RPM is reached at an inflection point 670. The minimum RPM continues until the pumps are restarted at an inflection point 672. Between the inflection point 670 and the inflection point 672, the RPM is substantially zero (in this case) or otherwise at a local minimum. After the inflection point 672, the RPM increases steadily as the pumps are ramped up until the drillstring tags the bottom of the wellbore during the peak 674. The peak 674 in the RPM is an artifact of the measurement apparatus (e.g., sensor) for RPM and does not represent a physical jump in RPM as the drillstring tags bottom. After the peak 674, RPM smooths out to a steady state value associated with drilling.

Figure 7A:
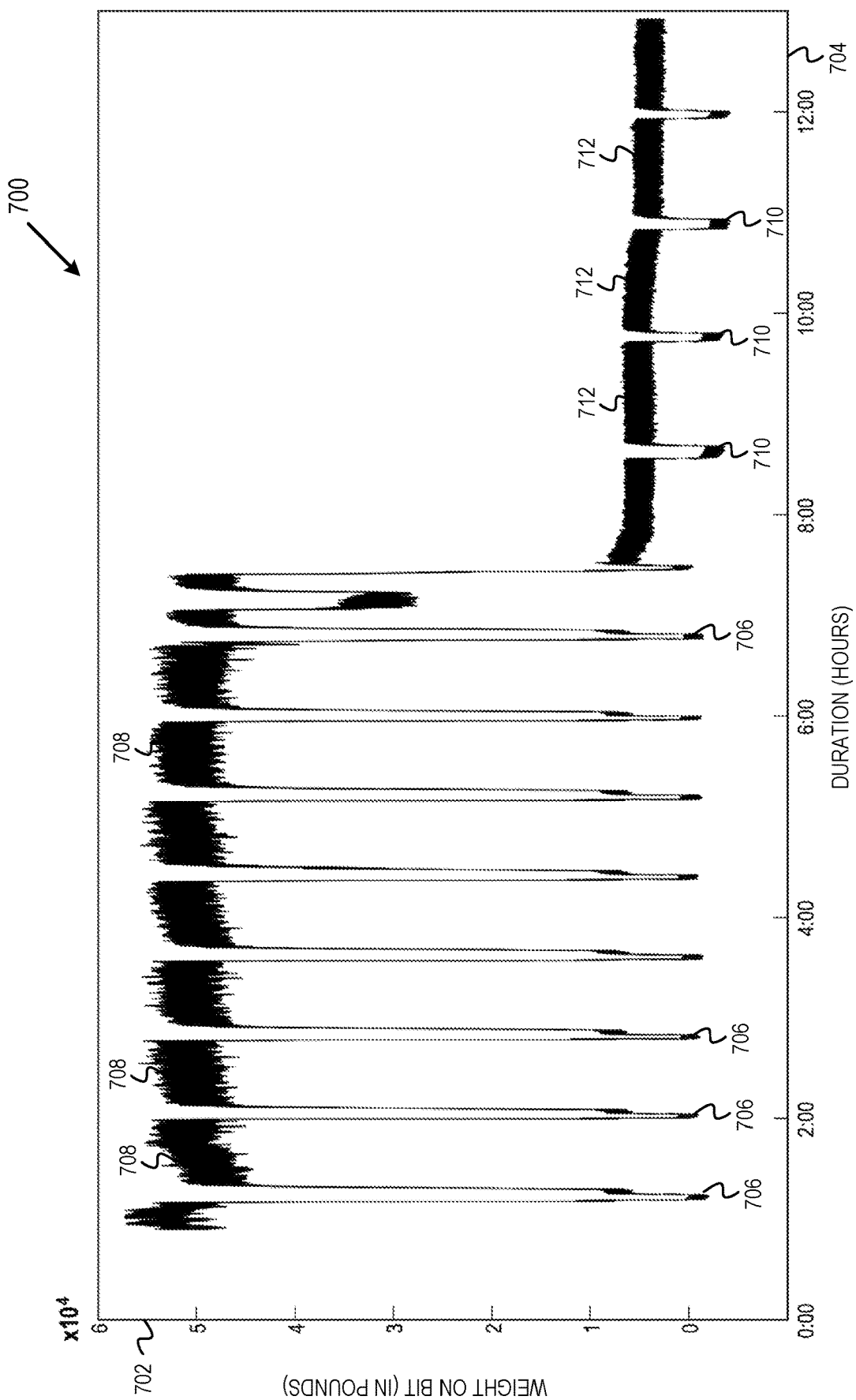
FIGS. 7A, 7B, and 7C depict graphs corresponding to strain measurements, torque measurements, and rotational velocity measurements acquired at a drill bit for multiple stand additions during drilling.
Figure 7B:
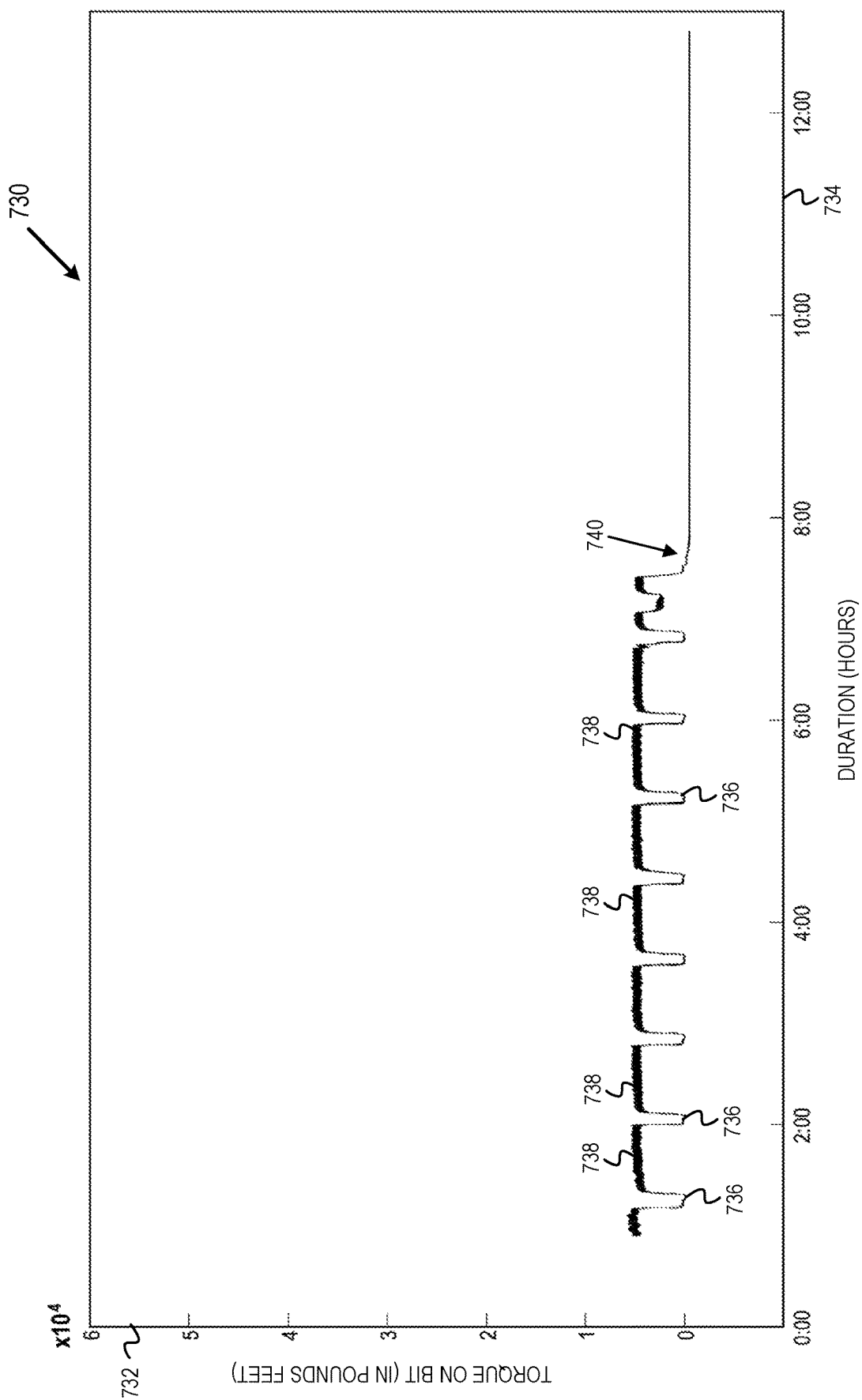
Figure 7C:
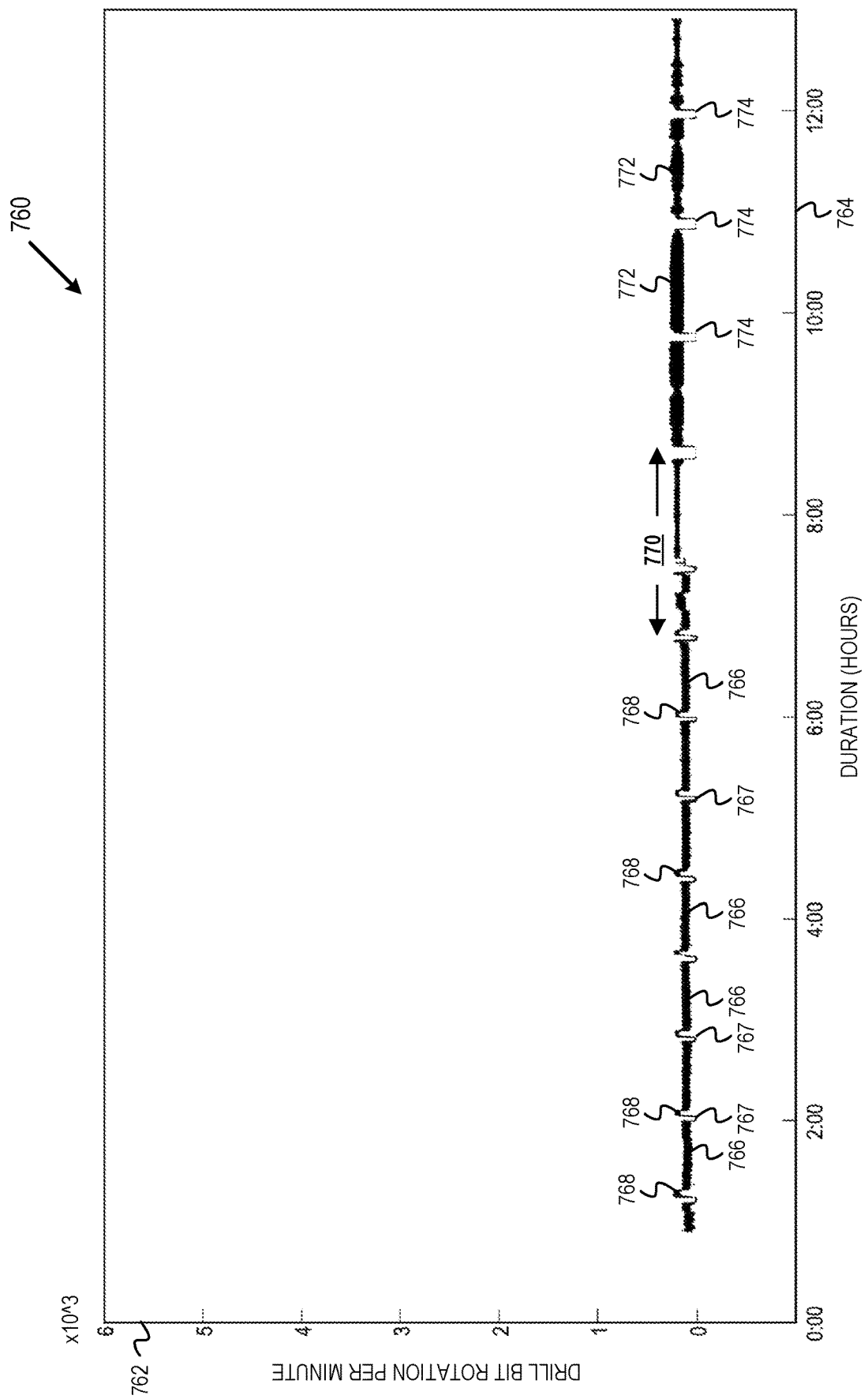

FIGS. 7A, 7B, and 7C depict graphs corresponding to strain measurements, torque measurements, and rotational velocity measurements acquired at a drill bit for multiple stand additions during drilling. FIG. 7A depicts a graph 700 displaying weight on bit (WOB) along y-axis 702 as a function of time along x-axis 704. The graph 700 depicts as collected WOB values which have not been adjusted for multiple stand additions and drilling events between those stand additions. Local maximums 708 represent WOB measurements obtained during drilling. Local minimums 706 represent WOB measurements obtained during stand additions, while drilling is paused. Several local maximums and local minimums are identified while others are not for graphical simplicity. The graph 700 also displays local maximums 712, representing WOB measurements obtained during drilling, and local minimums 710, representing WOB measurements obtained during stand additions while drilling in paused. The difference between the local maximums 708 and the local maximums 712 should be understood to correspond to different drilling modes. For example, the greater WOB displayed during the local maximums 708 may correspond to drilling in a vertical wellbore while the WOB displayed during the local maximums 712 may correspond to drilling in a lateral, horizontal, or otherwise nonvertical wellbore where WOB is decreases due to directionality of the wellbore.

FIG. 7B depicts a graph 730 displaying torque on bit (TOB) along y-axis 732 as a function of time along x-axis 734. The graph 730 depicts as collected TOB values which have not been adjusted for multiple stand additions and drilling events between those stand additions. Local minimums 736 represent TOB measurements obtained during stand additions, while drilling is paused. TOB values 738 represent TOB measurement during drilling. An arrow 740 indicates a time point corresponding to a change in the drilling mode. After the arrow 740, TOB measurements are significantly zero or otherwise at a local minimum. Such a change may be caused by a change in drilling—such as a change from run in to run out where the drill bit does not experience significant torque as the drill bit is removed from the hole. Such a change can also correspond to a change or failure in a TOB sensor or other measurement acquiring apparatus.

FIG. 7C depicts a graph 760 displaying drill bit rotations per minute (RPM) along y-axis 762 as a function of time along x-axis 764. The graph 760 depicts as collected RPM values which have not been significantly adjusted for multiple stand additions and drilling events between those stand additions. Local maximums 768 represent RPM measurements during off-bottom, fluid flowing portions of the stand addition. Local minimums 767 represent RPM measurements during off-bottom, no fluid flow portions of the stand addition—i.e., where RPM measurements are significantly zero or reflect a local minimum. RPM values 766 represent RPM measurements during drilling. An arrow 770 indicates a time period corresponding to a change in the drilling mode. After the arrow 770, local minimums 774 correspond to RPM measurements while drilling is paused. RPM values 772 represent RPM measurements during drilling or other drill bit rotation.

Figure 8:
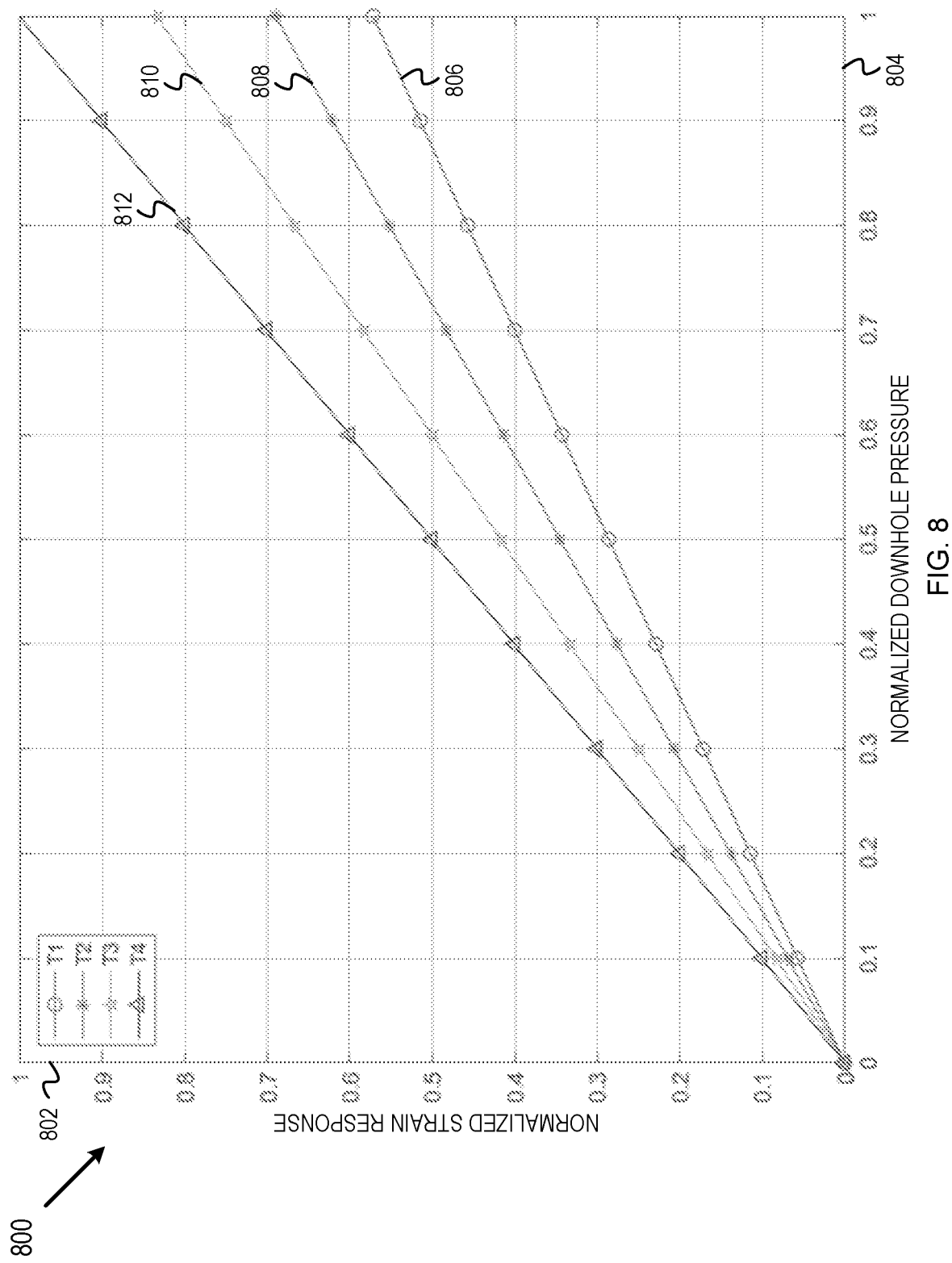
FIG. 8 depicts a graph of a relationship between normalized strain response and normalized downhole pressure as a function of temperature for an example wellbore and drillstring geometry.

FIG. 8 depicts a graph of a relationship between normalized strain response and normalized downhole pressure as a function of temperature for an example wellbore and drillstring geometry. FIG. 8 depicts a graph 800 displaying normalized strain response (in dimensionless units) along y-axis 802 as a function of normalized downhole pressure (in dimensionless units) along x-axis 804. The graph displays a relationship for a temperature T1 as a line 806, a relationship for a temperature T2 as a line 808, a relationship for a temperature T3 as a line 810, and a relationship for a temperature T4 as a line 812. Each of the displayed relationships shows a linear relationship between normalized downhole pressure and normalized strain response, where the slope of the relationship increases as a function of increasing temperature. The relationship between the temperatures of the graph 800 depends on the geometry and material of the strain gauge, such as the material of the filament, the filament's thickness, the change is resistivity of the filament with temperature, the coefficient of thermal expansion of various materials of the strain gauge, etc. For example, the graph 800 may represent a strain gauge of a given geometry and material A where T4>T3>T2>T1 or a strain gauge of the same or a different geometry of material B where T4<T3<T1, or any other relationship.

The relationship between the normalized strain response and the normalized downhole pressure may be other than linear, such as a polynomial or quasi exponential relationship. Further, the relationship between the normalized strain response and the normalized downhole pressure may be a product of two or more relationships, such as if the strain response is directly dependent on temperature and then a normalized temperature-adjusted strain response is related to normalized pressure.

Figure 9:
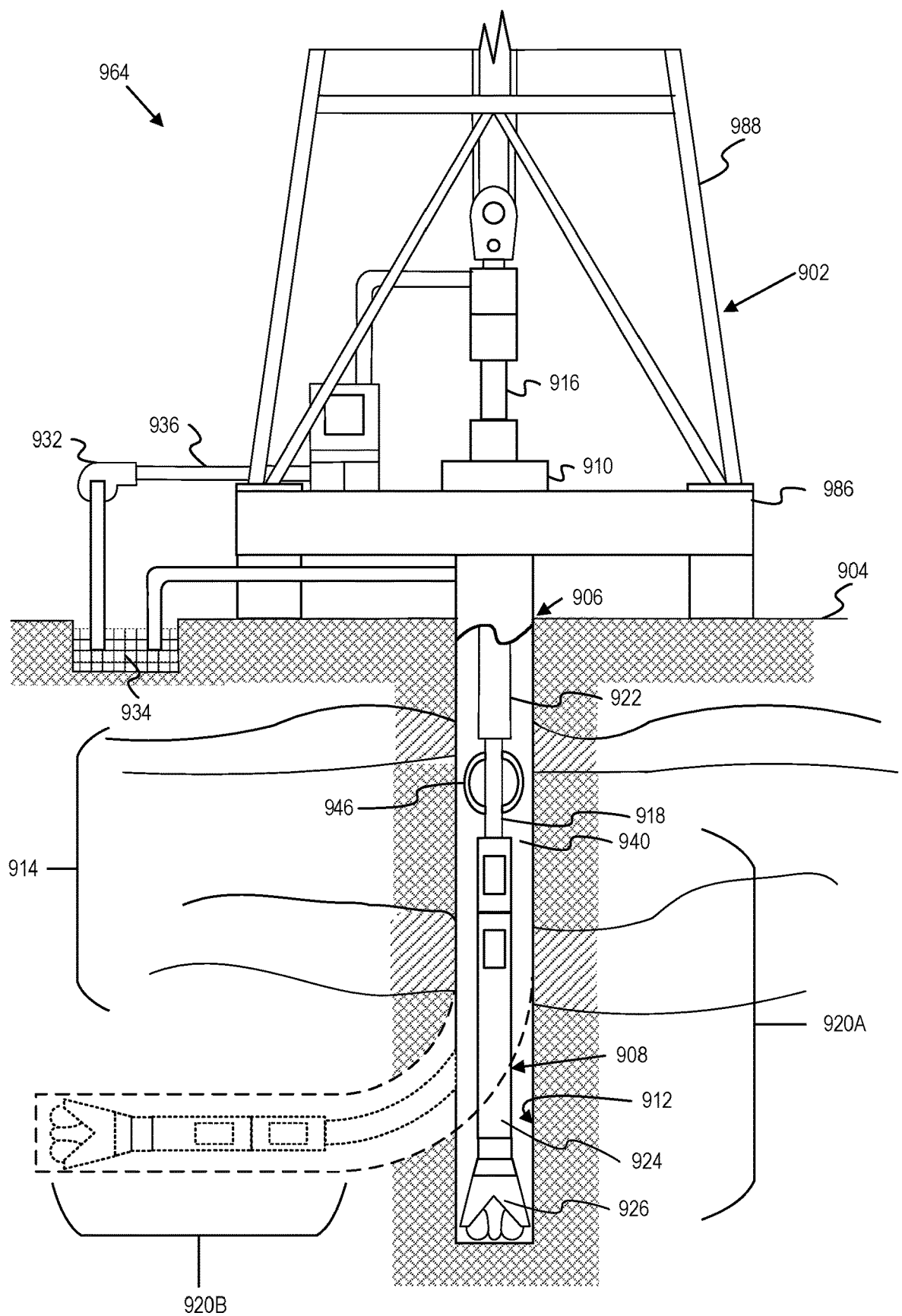
FIG. 9 depicts a schematic diagram of an example drilling system.

FIG. 9 depicts a schematic diagram of an example drilling system. In FIG. 9 a system 964 is formed from a portion of a drilling rig 902 located at the surface 904 of a well 906. Drilling of oil and gas wells is commonly carried out using a string of drill pipes connected together so as to form a drillstring 908 that is lowered through a rotary table 910 into a wellbore or borehole 912. Here a drilling platform 986 is equipped with a derrick 988 that supports a hoist.

The drilling rig 902 may thus provide support for the drillstring 908. The drillstring 908 may operate to penetrate the rotary table 910 for drilling the borehole 912 through subsurface formations 914. The drillstring 908 may include a kelly 916, drill pipe 918, and a bottom hole assembly 920A or 920B, perhaps located at the lower portion of the drill pipe 918. Both a vertical and lateral portion of the borehole 912 are depicted. It should be understood that drilling can take place at an inclination, including in a lateral borehole that trends upwards. The drillstring 908 may also include one or more centralizers 946 or other standoff devices. The one or more centralizer 946 may make intermittent or consistent contact with the borehole 912 as the drillstring 908 is advanced through the subsurface formations 914.

The bottom hole assembly 920 may include drill collars 922, a down hole tool 924, and a drill bit 926. The drill bit 926 may operate to create a borehole 912 by penetrating the surface 904 and subsurface formations 914. The down hole tool 924 may comprise any of a number of different types of tools including MWD tools, LWD tools, and others.

During drilling operations, the drillstring 908 (perhaps including the Kelly 916, the drill pipe 918, and the bottom hole assembly 920) may be rotated by the rotary table 910. In addition to, or alternatively, the bottom hole assembly 920 may also be rotated by a motor (e.g., a mud motor) that is located down hole. Additionally, the mud motor may be used as a communication device, such as via frequency or amplitude modulation, between the drill bit 926 and surface controller located at the surface 904. The drill collars 922 may be used to add weight to the drill bit 926. The drill collars 922 may also operate to stiffen the bottom hole assembly 920, allowing the bottom hole assembly 920 to transfer the added weight to the drill bit 926, and in turn, to assist the drill bit 926 in penetrating the surface 904 and subsurface formations 914.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation 914 cuttings created by operating the drill bit 926.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 10:
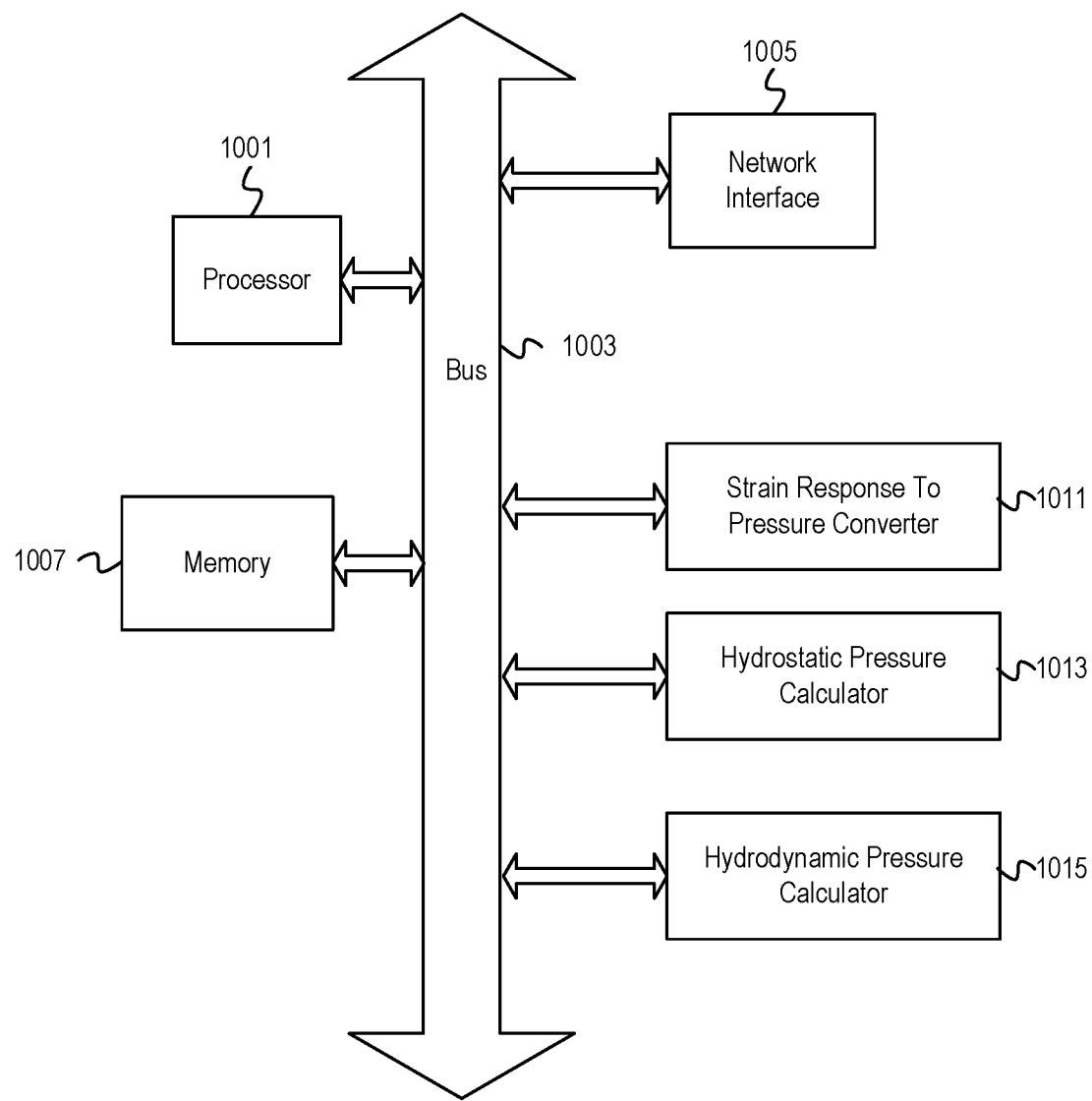
FIG. 10 depicts an example computer system with a strain response to pressure converter, a hydrostatic pressure calculator, and a hydrodynamic pressure calculator.

FIG. 10 depicts an example computer system with a strain response to pressure converter, a hydrostatic pressure calculator, and a hydrodynamic pressure calculator. The computer system includes a processor 1001 (possibly including multiple processors, multiple cores, multiple nodes, and/or implementing multi-threading, etc.). The computer system includes memory 1007. The memory 1007 may be system memory or any one or more of the above already described possible realizations of machine-readable media. The computer system also includes a bus 1003 and a network interface 1005. The system also includes a strain response to pressure converter 1011, a hydrostatic pressure calculator 1013, and a hydrodynamic pressure calculator 1015. The strain response to pressure converter 1011 converts a strain measurement to a measure of pressure or pressure value. The hydrostatic pressure calculator 1013 determines a measure of hydrostatic pressure based on strain measurements during the hydrostatic portion (i.e., off-bottom, no fluid flowing) of a stand addition. The hydrodynamic pressure calculator 1015 determines a measure of hydrodynamic pressure based on strain measurements during the hydrostatic portion and during the hydrodynamic portion (i.e., off-bottom, fluid flowing) of a stand addition. The hydrodynamic pressure calculator 1015 can instead determine a measure of hydrodynamic pressure based on strain measurements during the hydrodynamic portion of a stand addition and based on an output of the hydrostatic pressure calculator 1013. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

While the aspects of the disclosure are described with reference to various implementations and exploitations, it will be understood that these aspects are illustrative and that the scope of the claims is not limited to them. In general, techniques for determination of a measure of pressure based on strain measurements as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Embodiment 1: A method comprising: obtaining strain measurements from a strain gauge at a first location associated with a drillstring based on detection of a pause in drilling; determining a measure of hydrostatic pressure at the first location based on the strain measurements; and indicating the measure of hydrostatic pressure for monitoring of drilling.

Embodiment 2: The method of embodiment 1, wherein obtaining strain measurements from a strain gauge at a first location based on detection of a pause in drilling comprises: determining if the drillstring is off bottom; and based on a determination that the drill string is off bottom, selecting a subset of the strain measurements corresponding to the drillstring being off bottom, and wherein determining a measure of hydrostatic pressure at the first location comprises determining the measure of hydrostatic pressure at the first location based on the selected subset of the strain measurements.

Embodiment 3: The method of embodiment 2, wherein determining that the drillstring is off bottom comprises: obtaining weight on bit measurements and torque on bit measurements for a drill bit associated with the drillstring; determining if a local minimum in the weight on bit measurements occurs based on the weight on bit measurements; determining if the torque on bit measurements are substantially equal to zero; and based on the determination that there is a local minimum in the weight on bit measurements and that the torque on bit measurements are substantially equal to zero, determining that the drillstring is off bottom.

Embodiment 4: The method of any one of embodiments 1 to 3, wherein obtaining strain measurements from a strain gauge at a first location based on detection of a pause in drilling comprises: determining that drilling fluid is not flowing; and based on a determination that the drilling fluid is not flowing, selecting a subset of the strain measurements that correspond to the drilling fluid not flowing, wherein determining a measure of hydrostatic pressure at the first location comprises determining the measure of hydrostatic pressure at the first location based on the selected subset of strain measurements.

Embodiment 5: The method of embodiment 4, wherein determining that the drilling fluid is not flowing comprises: obtaining at least one of rotational velocity measurements for a drill bit associated with the drillstring and motor speed measurements for a drilling fluid pump associated with the drillstring; determining if the at least one of the rotational velocity measurements for the drill bit and the motor speed measurements for the drilling fluid pump is substantially equal to zero; and based on a determination that the at least one of the rotational velocity measurements for the drill bit and the motor speed measurements for the drilling fluid pump is substantially equal to zero, determining that the drilling fluid is not flowing.

Embodiment 6: The method of any one of embodiments 1 to 5, wherein determining the measure of hydrostatic pressure further comprises determining a measure of hydrodynamic pressure at the first location based on the strain measurements, and wherein indicating the measure of hydrostatic pressure comprises indicating the measure of hydrodynamic pressure for monitoring of drilling.

Embodiment 7: The method of embodiment 6, wherein determining a measure of hydrodynamic pressure comprises: determining a measure of hydrostatic-and-hydrodynamic pressure based on the strain measurements; and determining the measure of hydrodynamic pressure based on a difference between the measure of hydrostatic pressure and the measure of hydrostatic-and-hydrodynamic pressure.

Embodiment 8: The method of embodiment 6 or 7, wherein determining a measure of hydrodynamic pressure comprises: determining if the drillstring is off bottom; and based on a determination that the drill string is off bottom, selecting a subset of the strain measurements that correspond to the drillstring being off bottom, wherein determining a measure of hydrodynamic pressure at the first location comprises determining the measure of hydrodynamic pressure at the first location based on the selected subset of the strain measurements.

Embodiment 9: The method of embodiment 8, wherein determining that the drillstring is off bottom comprises: obtaining weight on bit measurements and torque on bit measurements for a drill bit associated with the drillstring; determining if the torque on bit measurements are substantially equal to zero; based on the determination that the torque on bit is substantially equal to zero, determining if the weight on bit measurements are substantially steady about a first weight on bit value, wherein the first weight on bit value does not correspond to a local minimum; and based on the determination that the weight on bit measurements are substantially steady about the first weight on bit value, determining that the drillstring is off bottom.

Embodiment 10: The method of any one of embodiments 6 to 9, wherein determining a measure of hydrodynamic pressure comprises: determining that drilling fluid is flowing; and based on a determination that the drilling fluid is flowing, selecting a subset of the strain measurements corresponding to the drilling fluid flowing, wherein determining a measure of hydrodynamic pressure at the first location comprises determining the measure of hydrodynamic pressure at the first location based on the selected subset of the strain measurements.

Embodiment 11: The method of embodiment 10, wherein determining that the drilling fluid is flowing comprises: obtaining at least one of rotational velocity measurements for a drill bit associated with the drillstring and motor speed measurements for a drilling fluid pump associated with the drillstring; determining if the at least one of the rotational velocity measurements for the drill bit and the motor speed measurements for the drilling fluid pump is substantially not equal to zero; and based on a determination that the at least one of the rotational velocity measurements for the drill bit and the motor speed measurements for the drilling fluid pump is substantially not equal to zero, determining that the drilling fluid is flowing.

Embodiment 12: The method of any one of embodiments 6 to 11, further comprising: determining a combined measure of flow rate and mud weight based on the measure of hydrodynamic pressure; and monitoring drilling based, at least in part, on the combined measure of flow rate and mud weight.

Embodiment 13: The method of any one of embodiments 6 to 11, further comprising: obtaining a measure of fluid flow for a drilling fluid associated with the drillstring; and determining a measure of mud weight based on the measure of hydrodynamic pressure and the measure of fluid flow.

Embodiment 14: The method of any one of embodiments 6 to 11, further comprising: obtaining a measure of mud weight for a drilling fluid associated with the drillstring; and determining a measure of fluid flow for the drilling fluid based on the measure of hydrodynamic pressure and the measure of mud weight.

Embodiment 15: The method of any one of embodiments 1 to 14, wherein determining a measure of hydrostatic pressure comprises: converting strain measurements to pressure measurements based on a relationship between strain measurements and pressure measurements determined for geometry associated with at least one of the drillstring and a wellbore associated with the drillstring.

Embodiment 16: The method of any one of embodiments 1 to 15, wherein the strain measurements comprise at least one or axial strain measurements and transverse strain measurements.

Embodiment 17: A non-transitory, machine-readable medium having instructions stored thereon that are executable by a computing device to perform operations comprising instruction to: obtain strain measurements from a strain gauge at a first location associated with a drillstring based on detection of a pause in drilling; determine a measure of hydrostatic pressure at the first location based on the strain measurements; and indicate the measure of hydrostatic pressure for monitoring of drilling.

Embodiment 18: The machine-readable medium of embodiment 17, wherein instructions to obtain strain measurements from a strain gauge comprise instructions to: determine if the drillstring is off bottom; determine that drilling fluid is not flowing; and based on a determination that the drill string is off bottom and that drilling fluid is not flowing, select a subset of the strain measurements corresponding to the drillstring being off bottom and drilling fluid not flowing, and wherein instructions to determine a measure of hydrostatic pressure at the first location comprises instructions to determine the measure of hydrostatic pressure at the first location based on the selected subset of the strain measurements.

Embodiment 19: The machine-readable medium of embodiment 17 or 18, wherein instructions to determine a measure of hydrostatic pressure further comprise instruction to determine a measure of hydrodynamic pressure at the first location based on the strain measurements, and wherein instructions to indicate the measure of hydrostatic pressure comprise instructions to indicate the measure of hydrodynamic pressure for monitoring of drilling.

Embodiment 20: The machine-readable medium of embodiment 19, wherein instructions to determine a measure of hydrodynamic pressure comprise instruction to: determining if the drillstring is off bottom; determine that drilling fluid is flowing; and based on a determination that the drill string is off bottom and that drilling fluid is flowing, selecting a subset of the strain measurements that correspond to the drillstring being off bottom and drilling fluid flowing, wherein determining a measure of hydrodynamic pressure at the first location comprises determining the measure of hydrodynamic pressure at the first location based on the selected subset of the strain measurements.

Embodiment 21: An apparatus comprising: at least one strain gauge at a first location associated with a drillstring; a processor; and a computer-readable medium having instructions stored thereon that are executable by the processor to cause the apparatus to, obtain strain measurements from the at least one strain gauge based on detection of a pause in drilling; determine a measure of hydrostatic pressure at the first location based on the strain measurements; and indicate the measure of hydrostatic pressure for monitoring of drilling.

Embodiment 22: The apparatus of embodiment 21, wherein the first location is associated with a drill bit of the drillstring.

Embodiment 23: The apparatus of embodiment 21 or 22, wherein instructions to determine a measure of hydrostatic pressure further comprise instruction to determine a measure of hydrodynamic pressure at the first location based on the strain measurements, and wherein instructions to indicate the measure of hydrostatic pressure comprise instructions to indicate the measure of hydrodynamic pressure for monitoring of drilling.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method for operating a drilling system, comprising:
   obtaining strain measurements from a strain gauge at a first location associated with a drillstring of the drilling system based on detection of a pause in drilling;
   determining a measure of hydrostatic pressure and a measure of hydrodynamic pressure at the first location from the strain measurements of the strain gauge;
   indicating the measure of hydrostatic pressure and the measure of hydrodynamic pressure for monitoring of the drilling; and
   controlling drilling equipment of the drilling system based on the measure of hydrostatic pressure and the measure of hydrodynamic pressure, wherein controlling the drilling equipment of the drilling system includes modifying flow rate or mud weight in the drilling system based on the measure of hydrostatic pressure and the measure of hydrodynamic pressure.

2. The method of claim 1, wherein obtaining the strain measurements from the strain gauge at the first location based on detection of the pause in the drilling comprises:
   determining if the drillstring is off bottom; and
   based on a determination that the drill string is off bottom, selecting a subset of the strain measurements corresponding to the drillstring being off bottom, and
   wherein determining the measure of hydrostatic pressure at the first location comprises determining the measure of hydrostatic pressure at the first location based on the selected subset of the strain measurements.

3. The method of claim 2, wherein determining that the drillstring is off bottom comprises:
   obtaining weight on bit measurements and torque on bit measurements for a drill bit associated with the drillstring;
   determining if a local minimum in the weight on bit measurements occurs based on the weight on bit measurements;
   determining if the torque on bit measurements are substantially equal to zero; and
   based on the determination that there is a local minimum in the weight on bit measurements and that the torque on bit measurements are substantially equal to zero, determining that the drillstring is off bottom.

4. The method of claim 1, wherein obtaining the strain measurements from the strain gauge at the first location based on detection of the pause in the drilling comprises:
   determining that drilling fluid is not flowing; and
   based on a determination that the drilling fluid is not flowing, selecting a subset of the strain measurements that correspond to the drilling fluid not flowing,
   wherein determining the measure of hydrostatic pressure at the first location comprises determining the measure of hydrostatic pressure at the first location based on the selected subset of the strain measurements.

5. The method of claim 4, wherein determining that the drilling fluid is not flowing comprises:
   obtaining at least one of rotational velocity measurements for a drill bit associated with the drillstring and motor speed measurements for a drilling fluid pump associated with the drillstring;
   determining if the at least one of the rotational velocity measurements for the drill bit and the motor speed measurements for the drilling fluid pump is substantially equal to zero; and
   based on a determination that the at least one of the rotational velocity measurements for the drill bit and the motor speed measurements for the drilling fluid pump is substantially equal to zero, determining that the drilling fluid is not flowing.

6. The method of claim 1, wherein determining the measure of hydrodynamic pressure comprises:
   determining a measure of hydrostatic-and-hydrodynamic pressure based on the strain measurements; and
   determining the measure of hydrodynamic pressure based on a difference between the measure of hydrostatic pressure and the measure of hydrostatic-and-hydrodynamic pressure.

7. The method of claim 1, wherein determining the measure of hydrodynamic pressure comprises:
   determining if the drillstring is off bottom; and
   based on a determination that the drill string is off bottom, selecting a subset of the strain measurements that correspond to the drillstring being off bottom,
   wherein determining the measure of hydrodynamic pressure at the first location comprises determining the measure of hydrodynamic pressure at the first location based on the selected subset of the strain measurements.

8. The method of claim 7, wherein determining that the drillstring is off bottom comprises:
   obtaining weight on bit measurements and torque on bit measurements for a drill bit associated with the drillstring;
   determining if the torque on bit measurements are substantially equal to zero;
   based on the determination that the torque on bit is substantially equal to zero, determining if the weight on bit measurements are substantially steady about a first weight on bit value, wherein the first weight on bit value does not correspond to a local minimum; and
   based on the determination that the weight on bit measurements are substantially steady about the first weight on bit value, determining that the drillstring is off bottom.

9. The method of claim 1, wherein determining the measure of hydrodynamic pressure comprises:
   determining that drilling fluid is flowing; and
   based on a determination that the drilling fluid is flowing, selecting a subset of the strain measurements corresponding to the drilling fluid flowing, wherein determining the measure of hydrodynamic pressure at the first location comprises determining the measure of hydrodynamic pressure at the first location based on the selected subset of the strain measurements.

10. The method of claim 9, wherein determining that the drilling fluid is flowing comprises:
obtaining at least one of rotational velocity measurements for a drill bit associated with the drillstring and motor speed measurements for a drilling fluid pump associated with the drillstring;
determining if the at least one of the rotational velocity measurements for the drill bit and the motor speed measurements for the drilling fluid pump is substantially not equal to zero; and
based on a determination that the at least one of the rotational velocity measurements for the drill bit and the motor speed measurements for the drilling fluid pump is substantially not equal to zero, determining that the drilling fluid is flowing.

11. The method of claim 1, further comprising:
determining a combined measure of flow rate and mud weight based on the measure of hydrodynamic pressure; and
monitoring the drilling based, at least in part, on the combined measure of flow rate and mud weight;
or
obtaining a measure of fluid flow for a drilling fluid associated with the drillstring; and
determining a measure of mud weight based on the measure of hydrodynamic pressure and the measure of fluid flow.

12. The method of claim 1, further comprising:
obtaining a measure of mud weight for a drilling fluid associated with the drillstring; and
determining a measure of fluid flow for the drilling fluid based on the measure of hydrodynamic pressure and the measure of mud weight.

13. The method of claim 1, wherein determining the measure of hydrostatic pressure comprises:
converting the strain measurements to pressure measurements based on a relationship between the strain measurements and the pressure measurements determined for geometry associated with at least one of the drillstring and a wellbore associated with the drillstring.

14. The method of claim 1, wherein detection of the pause in drilling comprises at least one of detection of an off-bottom event, detection of a stand addition, and detection of an addition of a drillstring component.

15. The method of claim 1, wherein the strain measurements comprise at least one of axial strain measurements and transverse strain measurements.

16. A non-transitory, machine-readable medium having instructions stored thereon that are executable by a computing device to perform drilling system operations comprising instructions to:
obtain strain measurements from a strain gauge at a first location associated with a drillstring of a drilling system based on detection of a pause in drilling;
determine a measure of hydrostatic pressure and a measure of hydrodynamic pressure at the first location from the strain measurements of the strain gauge;
indicate the measure of hydrostatic pressure and the measure of hydrodynamic pressure for monitoring of the drilling; and
control drilling equipment of the drilling system based on the measure of hydrostatic pressure and the measure of hydrodynamic pressure, wherein control of the drilling equipment of the drilling system includes modification of flow rate or mud weight in the drilling system based on the measure of hydrostatic pressure and the measure of hydrodynamic pressure.

17. The non-transitory, machine-readable medium of claim 16, wherein instructions to obtain the strain measurements from the strain gauge comprise instructions to:
determine if the drillstring is off bottom;
determine that drilling fluid is not flowing; and
based on a determination that the drill string is off bottom and that the drilling fluid is not flowing, select a subset of the strain measurements corresponding to the drillstring being off bottom and the drilling fluid not flowing, and
wherein instructions to determine the measure of hydrostatic pressure at the first location comprises instructions to determine the measure of hydrostatic pressure at the first location based on the selected subset of the strain measurements.

18. The non-transitory, machine-readable medium of claim 16, wherein instructions to determine the measure of hydrodynamic pressure comprise instruction to:
determining if the drillstring is off bottom;
determine that drilling fluid is flowing; and
based on a determination that the drill string is off bottom and that the drilling fluid is flowing, selecting a subset of the strain measurements that correspond to the drillstring being off bottom and the drilling fluid flowing,
wherein instruction to determine the measure of hydrodynamic pressure at the first location comprise instruction to determine the measure of hydrodynamic pressure at the first location based on the selected subset of the strain measurements.

19. An apparatus of a drilling system, comprising:
at least one strain gauge at a first location associated with a drillstring of the drilling system;
a processor; and
a computer-readable medium having instructions stored thereon that are executable by the processor to cause the apparatus to,
obtain strain measurements from the at least one strain gauge based on detection of a pause in drilling;
determine a measure of hydrostatic pressure and a measure of hydrodynamic pressure at the first location from the strain measurements of the at least one strain gauge;
indicate the measure of hydrostatic pressure and the measure of hydrodynamic pressure for monitoring of the drilling; and
control drilling equipment of the drilling system based on the measure of hydrostatic pressure and the measure of hydrodynamic pressure, wherein control of the drilling equipment of the drilling system includes modification of flow rate or mud weight in the drilling system based on the measure of hydrostatic pressure and the measure of hydrodynamic pressure.

20. The apparatus of claim 19, wherein the first location is associated with a drill bit of the drillstring.

* * * * *